(12) United States Patent
Murakami

(10) Patent No.: US 8,931,308 B2
(45) Date of Patent: Jan. 13, 2015

(54) METHOD OF PRODUCING GLASS BLANK FOR SUBSTRATE OF INFORMATION RECORDING MEDIUM, SUBSTRATE FOR INFORMATION RECORDING MEDIUM, AND INFORMATION RECORDING MEDIUM; AND MANUFACTURING APPARATUS FOR GLASS BLANK FOR SUBSTRATE OF INFORMATION RECORDING MEDIUM

(75) Inventor: Akira Murakami, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/363,464

(22) Filed: Feb. 1, 2012

(65) Prior Publication Data

US 2012/0204601 A1    Aug. 16, 2012

Related U.S. Application Data

(60) Provisional application No. 61/441,372, filed on Feb. 10, 2011.

(51) Int. Cl.
*C03B 7/10* (2006.01)
*C03B 7/14* (2006.01)
(Continued)

(52) U.S. Cl.
CPC ............... *C03B 11/088* (2013.01); *C03B 7/10* (2013.01); *C03B 7/14* (2013.01); *C03B 11/02* (2013.01); *C03B 35/005* (2013.01); *C03B 2215/03* (2013.01); *C03B 2215/70* (2013.01)
USPC .................................. 65/132; 65/123; 65/131

(58) Field of Classification Search
CPC .... C03B 11/088; C03B 11/125; C03B 11/07; C03B 11/12; C03B 11/122; C03B 11/02; C03B 11/086; C03B 11/10; C03B 7/005

USPC ............ 65/122–123, 126–127, 133, 207–226
See application file for complete search history.

(56) References Cited

U.S. PATENT DOCUMENTS 3,155,481 A * 11/1964 Boyce ............................. 65/104
3,306,723 A * 2/1967 Forber ........................... 65/184
(Continued)

FOREIGN PATENT DOCUMENTS

CN         1256254 A      6/2000
EP      1 008 562 A2      6/2000
(Continued)

OTHER PUBLICATIONS

International Search Report for JP Application No. PCT/JP2011/053148 dated May 24, 2011.
(Continued)

*Primary Examiner* — Jodi C Franklin
(74) *Attorney, Agent, or Firm* — Frommer Lawrence & Haug LLP

(57) ABSTRACT

A method of manufacturing a glass blank for a substrate for an information recording medium, the method including steps of: cutting out a gob of a glass material from a molten glass material by cutting the molten glass material discharged from a glass material outlet at a predetermined timing; causing the gob of the glass material to fall downwardly; pinching and pressing the gob of the glass material by a press unit having a pair of molds, the molds' surfaces facing to each other being press surfaces which are planes without an unevenness, so as to contact the falling gob of the glass material only to the press surfaces; and forming a circular flat plate-shaped glass blank having a target flatness as a glass substrate for a magnetic disk such that a ratio between a diameter and a thickness of the glass blank is within a range of from 50:1 to 150:1, from the gob of the glass material.

8 Claims, 17 Drawing Sheets

(51) Int. Cl.
*C03B 11/08* (2006.01)
*C03B 11/02* (2006.01)
*C03B 35/00* (2006.01)

(56) References Cited

U.S. PATENT DOCUMENTS

| | | | | |
|---|---|---|---|---|
| 3,900,328 | A * | 8/1975 | Parsons et al. | 501/11 |
| 4,961,773 | A * | 10/1990 | Takahara et al. | 65/174 |
| 5,275,637 | A * | 1/1994 | Sato et al. | 65/66 |
| 6,539,750 | B1 * | 4/2003 | Takagi et al. | 65/64 |
| 7,305,854 | B2 * | 12/2007 | Murakami | 65/102 |
| 7,415,842 | B2 * | 8/2008 | Sakata et al. | 65/64 |
| 8,051,678 | B2 * | 11/2011 | Nishimoto et al. | 65/105 |
| 8,056,364 | B2 * | 11/2011 | Sakai et al. | 65/66 |
| 8,257,831 | B2 | 9/2012 | Yagi | |
| 2002/0009602 | A1 | 1/2002 | Kitayama et al. | |
| 2002/0046577 | A1 * | 4/2002 | Maeda et al. | 65/85 |
| 2002/0054976 | A1 * | 5/2002 | Nakamura et al. | 428/66.6 |
| 2002/0184921 | A1 | 12/2002 | Kawata et al. | |
| 2003/0051508 | A1 * | 3/2003 | Uezaki et al. | 65/66 |
| 2003/0066312 | A1 * | 4/2003 | Sakai et al. | 65/102 |
| 2003/0100433 | A1 * | 5/2003 | Hayashi et al. | 501/79 |
| 2003/0134734 | A1 * | 7/2003 | Nishimoto et al. | 501/69 |
| 2004/0194508 | A1 * | 10/2004 | Nishimoto et al. | 65/33.1 |
| 2004/0237592 | A1 * | 12/2004 | Iguchi et al. | 65/127 |
| 2004/0261454 | A1 * | 12/2004 | Yoshida et al. | 65/21.3 |
| 2005/0204777 | A1 | 9/2005 | Mori et al. | |
| 2005/0210923 | A1 * | 9/2005 | Yamashita et al. | 65/61 |
| 2005/0268654 | A1 * | 12/2005 | Haase | 65/29.1 |
| 2006/0090512 | A1 * | 5/2006 | Fujimoto et al. | 65/29.19 |
| 2006/0090517 | A1 * | 5/2006 | Kawata et al. | 65/322 |
| 2006/0260361 | A1 * | 11/2006 | Yoshida et al. | 65/67 |
| 2007/0044515 | A1 * | 3/2007 | Pfeiffer | 65/66 |
| 2008/0041108 | A1 * | 2/2008 | Murakami | 65/62 |
| 2008/0047302 | A1 * | 2/2008 | Wolf et al. | 65/127 |
| 2008/0110207 | A1 * | 5/2008 | Fukuda et al. | 65/66 |
| 2009/0220824 | A1 * | 9/2009 | Ikenishi et al. | 428/846.9 |
| 2009/0223251 | A1 * | 9/2009 | Tomisaka | 65/66 |
| 2010/0323221 | A1 * | 12/2010 | Ishiyama | 428/800 |
| 2011/0277508 | A1 * | 11/2011 | Osawa et al. | 65/97 |
| 2011/0283739 | A1 * | 11/2011 | Osawa et al. | 65/60.1 |
| 2012/0100981 | A1 * | 4/2012 | Negishi et al. | 501/42 |
| 2012/0247155 | A1 * | 10/2012 | Murakami et al. | 65/60.1 |
| 2013/0042649 | A1 * | 2/2013 | Isono et al. | 65/61 |

FOREIGN PATENT DOCUMENTS

| | | |
|---|---|---|
| EP | 1 008 562 A3 | 12/2000 |
| JP | 11-189423 | 7/1999 |
| JP | 2001-328827 | 11/2001 |
| JP | 2002/03241 | 1/2002 |
| JP | 2003-054965 | 2/2003 |
| JP | 2003-073136 | 3/2003 |
| JP | 2004-026570 | 1/2004 |
| JP | 2004-59355 | 2/2004 |
| JP | 3709033 | 10/2005 |
| JP | 2008-003241 | 1/2008 |
| JP | 2008/169056 | 7/2008 |
| JP | 2008-273779 | 11/2008 |
| JP | 4380379 | 12/2009 |

OTHER PUBLICATIONS

Notification of Reasons for Rejection for JP Application No. 2012-146910 dated Mar. 5, 2013.
Decision of Rejection for JP Application No. 2012-146910 dated Jun. 5, 2013.
English translation of JP 2002-03241; published Jan. 9, 2002.
Notification of first office action for CN application No. 201010299455.X dated Dec. 4, 2013.
Notice of Allowance for JP application No. 2012-146910 dated Nov. 5, 2013.
Notification of Second Office Action for CN Application No. 201010299455.X dated Jul. 14, 2014.
International Search Report for PCT Application No. PCT/JP2011/053148 dated May 24, 2011.

* cited by examiner

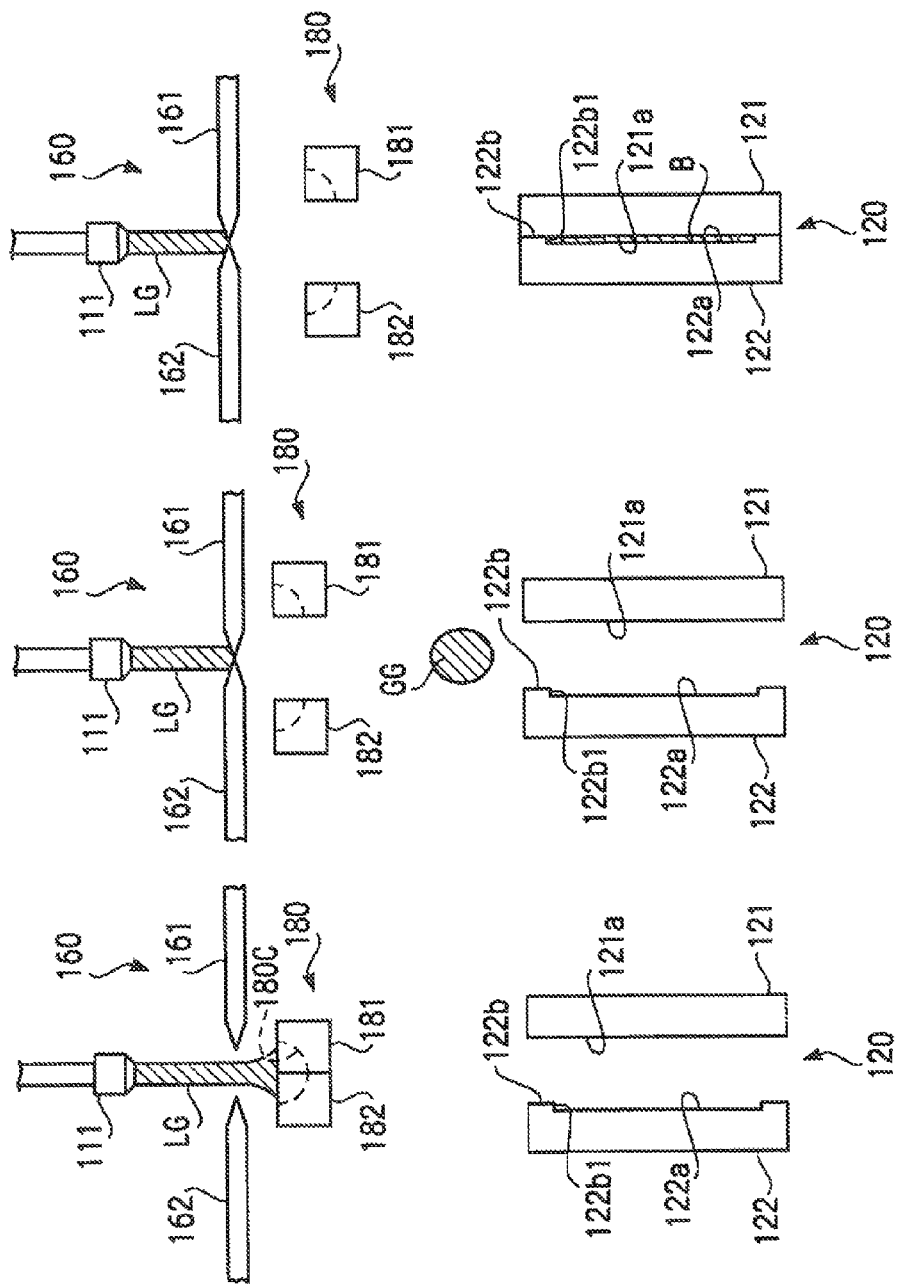

METHOD OF PRODUCING GLASS BLANK FOR SUBSTRATE OF INFORMATION RECORDING MEDIUM, SUBSTRATE FOR INFORMATION RECORDING MEDIUM, AND INFORMATION RECORDING MEDIUM; AND MANUFACTURING APPARATUS FOR GLASS BLANK FOR SUBSTRATE OF INFORMATION RECORDING MEDIUM

CROSS-REFERENCE TO RELATED APPLICATION

This application claims the benefit of U.S. Provisional Application No. 61/441,372, filed on Feb. 10, 2011. The entire subject matter of the application is incorporated herein by reference.

TECHNICAL FIELD

This invention relates to a method of producing a glass blank for a substrate of an information recording medium, a substrate of an information recording medium, and an information recording medium, and relates to a manufacturing apparatus for the glass blank for the substrate of the information recording medium.

BACKGROUND

As a substrate for a high-density recording medium such as a hard disk, a glass blank, which is a thin-plate like glass molding product, is used. In general, the glass blank is produced by shaping a block (gob) of heated and melted glass, while pinching the gob between an upper mold and an lower mold and cooling the gob, using a device described in Japanese Patent Publication No. 3709033 (hereafter, referred to as patent document 1). Specifically, the gob is dropped on the lower mold, and then the upper mold is driven toward the lower mold, thereby pressing the gob between the upper mold and the lower mold. In addition, in order to improve mold separability of the glass blank, temperatures of the upper mold and the lower mold are set near a glass transition temperature of the gob.

Further, in the device described in patent document 1, in order to produce the glass blank efficiently, a plurality of lower molds are prepared for one upper plate. After the shaping of the glass blank between the upper mold and one of the plurality of lower mold has been finished, the upper mold is separated from the lower mold and performs shaping of another glass blank with another lower mold. The glass blank is taken out from the lower mold which has been separated from the upper mold, and the lower mold is cooled. Then, at a next step, the glass blank is polished and cut, thereby forming a disk-shaped substrate for recording information, which is shaped in a true circle, and whose surface is finished like a mirror surface. An information recording medium (a platter of a hard disk) is formed through forming an information recording layer, such as a layer of a magnetic material, on the substrate for recording information.

SUMMARY OF THE INVENTION

In this manner, in the configuration of patent document 1, first, the gob is dropped on the lower mold. Therefore, a large temperature difference arises between a portion of the lower mold to which the gob contacted first and the other portion of the lower mold, and a deformation arises on the lower mold. In addition, since the heat on the gob is deprived from the portion contacting with the lower mold, a temperature gradient arises on the gob. Such a deformation of the lower mold or a temperature gradient on the gob affects on a flatness of the surface of the glass blank and a thickness of the glass blank. In order to have a glass blank with a high flatness, it can be considered to set the temperature of the upper mold and the lower mold higher than the glass transition temperature of the gob. In this case, in order to avoid adhesion of a glass material to the lower mold, which contacts with the high temperature glass material for a long time, soon after the glass material flowing out, it is necessary to apply a powdery release agent on the surface of the lower mold. However, when the release agent is used, a surface roughness of the glass blank becomes large, and it takes a longer time for the polishing process. Further, there is a problem such that at the polishing process a large amount of waste materials occur.

Further, a magnetic disk formed of the glass blank, which is for a hard disk device, is in a very close proximity (about 5 nm) to a magnetic head for reading information from and writing information to the magnetic disk, when the hard disk device is in use. In order to allow the magnetic head to read from or write to the magnetic disk, it is required to retain a state where the magnetic head is in the close proximity to the magnetic disk, without contacting the magnetic head to the magnetic disk. Therefore, the magnetic disk is required to have a recording surface with a high flatness, and the magnetic disk is required to have a uniform thickness.

Therefore, when producing a magnetic disk for a hard disk device with the glass blank which has been manufactured with the device of patent document 1, it is required to perform surface grinding (a wrap process, etc.) to improve its surface flatness and to make a plate thickness uniform, and after that, it is required to perform a center drilling process, an inner and outer circumference processing, polishing, and a formation of a magnetic recording layer (information recording layer). Further, polishing (polishing process) is a process to improve the surface roughness. Thus, it is required that the glass blank is in a state where the flatness is sufficiently high, prior to polishing.

However, in the configuration of patent document 1, since cooling of the glass on the upper surface and on the lower surface cannot become symmetric in the process of producing the glass blank from the gob, the flatness of the glass is degraded during the cooling process after the pressing. Thus, it is required to improve the flatness and uniformize the thickness through the surface grinding, after producing the glass blank.

In addition, as a method of producing the magnetic disk, besides the method of producing the glass blank through pressing, there is a method in which a sheet glass produced with the float method or the down draw method is processed and a magnetic disk is obtained. Specifically, a disk-shaped glass is cut out from the obtained sheet glass, and after that, the center drilling process, the inner and outer circumference processing, the polishing, and the formation of a magnetic recording layer are performed. The sheet glasses produced with the above methods have sufficiently high flatnesses and their thicknesses are uniform. Therefore, in the above described method, the surface grinding can be omitted.

However, in the above method, since the disk-shaped glass is cut out from the large-sized sheet glass, the method has a problem in which a large amount of glass materials are lost, in comparison with the method of producing the glass blank by pressing.

The present invention is achieved to overcome the above described problems. Namely, objectives of the present invention is to provide methods of producing a glass blank for a substrate of an information recording medium, a substrate for an information recording medium, and an information recording medium, respectively, with which a glass blank whose surface has a high flatness and whose thickness is uniform can be obtained, and to provide a manufacturing apparatus of a glass blank for a substrate of an information recording medium.

In order to achieve the above described objectives, in a method of manufacturing a glass blank for an information recording medium according to the present invention, a gob of glass material is cut out from a molten glass material by cutting the glass material discharged from a glass material outlet at a predetermined timing, and then, a press unit having a pair of molds, whose surfaces facing to each other are press surfaces which are planes without an unevenness, pinches and presses the falling gob of the glass material between the press surfaces so that the falling gob of the glass material contact only with the press surfaces, thereby forming a circular flat plate-shaped glass blank having a target flatness as an information recording substrate such that a ratio between a diameter and a thickness of the glass blank is within a range of from 50:1 to 150:1, from the gob of the glass material.

With such a configuration, the glass material spreads all over the press surfaces of the molds in a short time, and heat of the gob of the glass material is rapidly deprived by the pair of the molds. Unlike the case, as the method described in patent document 1, where only the lower mold is heated by the high-temperature glass material and a temperature of a lower portion of the glass material is locally lowered, deformations of the molds by a temperature gradient are prevented, and almost no temperature gradient occurs in the glass material. Therefore, a glass blank having a high surface flatness and uniform plate thickness can be obtained, even if the temperature of the mold is set to be less than the glass transition temperature of the glass material. Further, in this configuration, since there is no need to apply a release agent to the molds, the glass blank having a fine surface roughness (namely, a surface roughness substantially equal to the surface roughness of the press surfaces) can be obtained. Namely, by processing the press surfaces so as to have a desired surface roughness value, the surface roughness of the glass blank can be regulated. Therefore, it is possible to reduce an amount of a surface layer of the main surfaces of the glass blank to be removed at a post-process and to set the surface roughness of the main surfaces of the glass blank to be within a suitable range for a post-process, by reducing the surface roughness of the main surfaces of the glass blank.

Further, in the present invention, "the plane without an unevenness" does not exclude a plane having a tiny unevenness formed by applying a usual flattening process or mirror surface polishing process for manufacturing a press mold. However, a more bigger unevenness compared with such a tiny unevenness is not included in "the plane without an unevenness," because it can lead to a degradation of a flow resistance of glass at a time of press shaping or can promote partial cooling of the molten glass gob. Specifically, a plane including a convex portion shaped substantially like a point and/or a line with a height less than or equal to 20 µm is included in "the plane without an unevenness." Further, it is preferable that the height of the convex portion is less than 10 µm, and it is more preferable that the height of the convex portion is less than 5 µm. Further, the more bigger convex portion compared with such a tiny convex portion is substantially not shaped like a point or a line, but it is a convex portion in a trapezoidal shape having the smallest width of several mm or a more greater order on its top surface, or, a convex portion formed like a dome having a comparable height and size as that of the convex portion in the trapezoidal shape. Such a convex portion can lead to a degradation of a flow resistance of glass at time of press shaping or can promote-partial cooling of the molten glass gob. However, when a plane includes a convex portion with above described shape, if its height is less than or equal to 50 µm, then the plane is included in "the plane without an unevenness." Further, it is preferable that the height is less than or equal to 30 µm, and it is more preferable that the height is less than or equal to 10 µm. Further, from a viewpoint of preventing generation of a clack by concentrating stresses at an intersection point of a bottom surface and a side surface of the convex portion in the trapezoidal shape, it is preferable that the side surface of the convex portion in the trapezoidal shape is forming a plane or a concaved plane such that its tilt angle with respect to the top surface is less than or equal to 1.0 degree. Further, the angle is more preferable to be less than 0.5 degree.

It is preferable that the pressing of the glass material by the press unit is configured such that the pressing is performed by moving the press unit from a first condition, in which a distance between the press surfaces of the pair of molds is greater than a size in a horizontal direction of the gob of the glass material (a condition n which the glass material to be pressed can go into a gap between the press surfaces of the pair of molds), to a second condition, in which the distance between the press surfaces of the pair of molds substantially coincides with a size in a direction of the thickness of the glass blank, within 0.1 second after the gob of the glass material contacts one of the pair of molds.

With such a configuration, the glass material can be pressed to be thin and to have a uniform thickness. Namely, the falling gob of glass material is pressed so as to contact only with the press surface of the pair of molds. Since the glass material is mainly deprived of heat only by the pair of press surfaces contacting with the glass material, the glass material after pressing can be cooled symmetrically from one of the press surface side and from the other press surface side. Thus the flatness of the glass blank becomes higher. Further, it is preferable that the pressing is performed such that the gob of the glass material contacts only with the press surfaces, because the flatness is degraded when the glass contacts with a spacer described below during pressing, or the glass spreads out of the facing pair of press surfaces. Further, "after the gob of the glass material contacts with one of the pair of molds," described above, includes a state in which "the gob of the glass material simultaneously contacts with both of the pair of molds."

Further, it is preferable that temperatures of the pair of molds are regulated to be less than a glass transition temperature of the glass material. With such a configuration, an adhesion between the glass material and the molds can be prevented.

Additionally, it is preferable that the molten glass material discharged from the glass material outlet is cut and the gob of the glass material is formed by moving cutting blades placed below the molten glass outlet so as to intersect with the glass material.

With this configuration, it becomes easier to accurately separate the gob of glass material corresponding to an amount of one glass blank from the molten glass blank. The glass material can be completely stored in between the press surfaces facing to each other during pressing. Therefore, spreading out of the glass material from the gap between the press surfaces can be prevented. The spreading out of the glass material from the gap between the press surfaces degrades parallelism of the press surfaces facing to each other during pressing and can be a cause to increase a deviation of the plate thickness of the glass blank. Thus, with this configuration, a glass blank having a high parallelism of both sides and a small deviation of the plate thickness can be obtained.

Further, the surface roughness of the press surface is preferably configured within a range from 0.01 μm to 10 μm. With this configuration, the surface roughness of the formed glass blank can be confined within a range which is suitable for a post-process, such as a polishing process, described below. Additionally, the surface roughness in the present invention refers to the arithmetic average roughness, Ra, defined in JIS B0601.

Further, a viscosity of the gob of the glass material is preferably within a range from 50 to 1050 dPa·s. With this configuration, the glass material can be formed in a desired shape within a short time. If the above viscosity is less than 50 dPa·s, then it becomes difficult to form the gob of the glass material. If the above viscosity exceeds 1050 dPa·s, then it becomes difficult to form a glass blank in a thin-plate shape by pressing in a short time.

Further, it is preferable that the glass blank manufacturing apparatus is configured such that the pressing state is maintained until the temperature of the glass material becomes lower than its deformation point. By maintaining the pressing state until the temperature becomes the above temperature, the glass blank can be symmetrically cooled from both sides of the glass blank, from the start of the pressing until the temperature becomes the above temperature. Thus, the flatness of the glass blank can be further improved. Additionally, in the present invention, a substrate for an information recording medium or a substrate for an information recording medium includes a magnetic information recording medium substrate, namely, a glass substrate for a magnetic disk.

Further, a method of manufacturing the substrate for the information recording medium is characterized in that the glass blank is manufactured with any of the above described methods, and the glass blank is grinded to be a disk of a true circle with a predetermined diameter, and after that, a polishing process is applied. In this manufacturing method, a surface grinding, such as a wrap process, is not performed. Thus, the substrate for the information recording medium can be produced with fewer processes.

Further, an information recording medium manufacturing method of the present invention is characterized in that the substrate for the information recording medium is produced with the above described method, and then, information recording layers are formed on the substrate for the information recording medium.

Further, a manufacturing apparatus for manufacturing a glass blank for a substrate of an information recording medium, comprises: a glass material gob generating unit that drops a gob of the glass material downward; and a press unit. The glass material gob generating unit includes: a glass material outlet that discharges a molten glass material; and a cutting unit that cuts out a gob of the glass material from the molten glass material at a predetermine timing. The press unit includes: a pair of molds whose surfaces facing to each other are press surfaces; and a mold driving unit that moves the pair of molds in directions for approaching and separating the pair of molds to each other. The press unit forms a plate-shaped glass blank from the gob of the glass material through pinching and pressing the falling gob between the press surfaces of the pair of molds. The press surfaces facing to each other are formed as planes without an unevenness. A spacer is provided to one of the pair of molds at a position neighboring to the press surface of the one of the pair of molds, and the spacer contacts with the mold facing to the spacer so as to keep a distance between the pair of molds constant. Here, "a pair of molds whose surfaces facing to each other are press surfaces" means a pair of molds whose press surfaces are placed to face to each other at least when pressing the gob of the glass material, and it is not necessary that the press surfaces are arranged so as to always face to each other. Needless to add, but they can be arranged so as to always face to each other. Additionally, the spacer can be a separated piece from the mold, and can be an integrated piece of the mold. Further, the above glass blank manufacturing device includes an aspect in which only one of the above described pair of molds includes the spacer, and an aspect in which both of the pair of molds include the spacers.

Further, preferably, the press surfaces facing to each other are circular, and a ratio between a diameter of each of the press surfaces and a distance between the facing press surfaces during pressing is within a range of 50:1 to 150:1.

If the glass material spreads out from the press surface during pressing, the glass material spreading out is pinched between the pair of molds except at the press surfaces, and problems arises such that the glass blank having a uniform predetermined thickness cannot be obtained, or such that parallelism of the press surfaces to each other during pressing is degraded, and parallelisms of the both of main surfaces of the glass blank are degraded. Further, for the glass blank for the substrate for the information recording medium, a desired ratio between a diameter and a thickness is within a range between 50:1 to 150:1. In this embodiment, the ratio between each of the diameter of the press surfaces and the distance between the facing press surfaces is set as the above described configuration, and an amount of the gob of the glass material is set to be an amount such that the glass blank having the ratio between the above diameter and the thickness is formed. Therefore, when pressing, the glass material is completely stored between the press surfaces, without spreading out the glass material from the gap between the press surfaces of the pair of molds. In this manner, a glass blank which does not generate above described problems can be obtained.

It is preferable that the press surfaces are vertical surfaces.

The gob of the glass material can be vertically dropped, when a pipe for supplying the glass material to the glass material outlet is placed so that the glass material outlet opens downwardly and the gob of the glass material is formed by cutting the glass material in a state in which the molten glass material hangs downwardly from the glass material outlet. As described above, in order to improve the flatness of the glass blank, it is preferable that the glass is cooled, as symmetrically as possible with respect to the surface perpendicular to the direction of the pressing, in the process of forming the glass blank by pressing the gob of the glass material. When pressing the falling gob of the glass material with the pair of the molds, it is preferable that the gob of the glass material contacts with the respective press surfaces of the pair of the molds simultaneously, or substantially simultaneously. Therefore, by placing the press surfaces in the vertical surfaces as described above, it becomes easier to contact the falling gob of the glass material with respective press surfaces of the pair of molds simultaneously or substantially simultaneously and to press the gob.

As described above, according to the manufacturing method or the manufacturing apparatus of the present invention, the glass blank such that its surface flatness is high and its plate thickness is uniform, and the substrate for the information recording medium whose raw material is the glass blank, and the information recording medium whose raw material is the substrate for the information recording medium, can be manufactured.

BRIEF DESCRIPTION OF THE DRAWINGS

FIGS. 3A, 3B, and 3C are a surrounding area of a press unit of the glass blank manufacturing apparatus in another example of the first embodiment of the present invention.

DETAILED DESCRIPTION OF EMBODIMENTS

Figure 1:
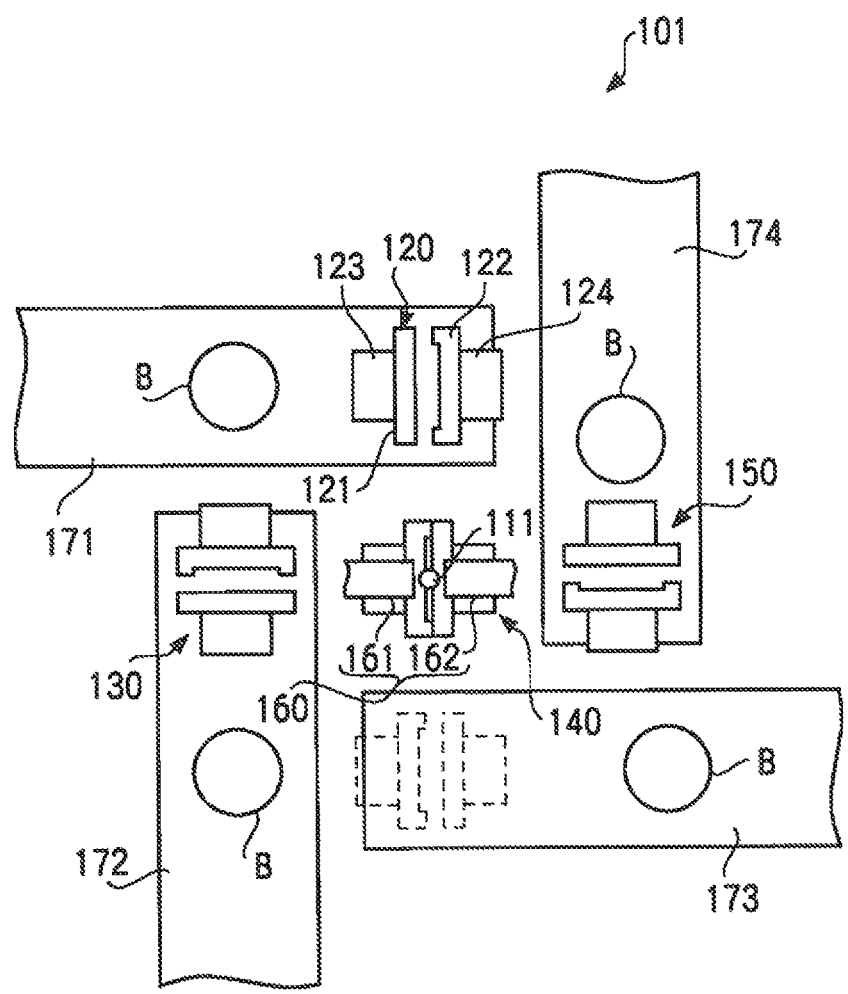
FIG. 1 is a top view of a glass blank manufacturing apparatus according to an first embodiment of the present invention.

Hereinafter, embodiments of the present invention are explained in detail using figures. FIG. 1 is a plain view of a glass blank manufacturing apparatus 101 according to a first embodiment of the present invention. The glass blank manufacturing apparatus 101 of this embodiment is an apparatus for manufacturing glass blank which is a disk-shaped glass molded product. The glass blank produced with the glass blank manufacturing apparatus 101 according to this embodiment is cut in a disk-shape of a true circle with a device for a successive process (described later), and its front surface and back surface are polished to be like mirror surfaces, thereby forming a substrate for an information recording medium. A magnetic disk (such as a platter of a hard disk), which is the information recording medium, is produced through forming an information recording layer of a magnetic material or the like on the substrate for the information recording medium.

As shown in FIG. 1, the glass blank manufacturing apparatus 101 has a configuration such that 4 sets of press units 120, 130, 140 and 150 are arranged at every 90 degrees, while placing a center of them at an molten glass outlet 111.

The press units 120, 130, 140, and 150 are driven by shifting means, not shown in figures, respectively, and they can move back and forth with respect to the molten glass outlet 111. Namely, they are movable between a catch position placed immediately below the molten glass outlet 111 (in FIG. 1, a position where the press unit 140 is drawn with a solid line) and a retreat position apart from the molten glass outlet 111 (in FIG. 1, positions where the press units 120, 130, and 150 are drawn with solid lines, and a position where the press unit 140 is drawn with a dashed line).

A cutting unit, which is to form a block (gob) of molten glass by cutting a suitable amount of molten glass discharged from the molten glass outlet 111, is provided between the catch position and the molten glass outlet 111. As shown in FIG. 1, the cutting unit includes a pair of cutting blades 161 and 162, which are plane blades. The cutting blades 161 and 162 are driven so that they are butted together under the molten glass outlet 111 at a constant timing. When the cutting blades 161 and 162 are butted together, the molten glass is cut and the gob is formed. The gob cut out falls toward the catch position.

As described above, in this embodiment, the cutting blades 161 and 162, which are plane blades, are butted together and the gob is formed through cutting the molten glass. Thus, the gob is separated from the molten glass and falls, at the moment when the cutting blades 161 and 162 are butted together.

The press unit 120 includes a first mold 121, a second mold 122, a first drive unit 123 and a second drive unit 124. The first mold 121 and the second mold 122 are plate-like members arranged such that their normal directions substantially coincide with the horizontal direction and they face to each other. The first drive unit 123 moves the first mold 121 back and forth with respect to the second mold 122. On the other hand, the second drive unit 124 moves the second mold 122 back and forth with respect to the first mold 121. For the first drive unit 123 and the second drive unit 124, something which can make the first mold 121 and the second mold 122 become rapidly closer by driving the first drive unit 123 and the second driving unit 124, such as a air cylinder or a combination of a solenoid and a coil spring, can be used.

Since configurations of the press unit 130, 140 and 150 are the same as the configuration of the press unit 120, their explanations are omitted.

Each of the press units is configured to form a disk-shaped glass blank B such that, after the press unit is moved to the catch position, the first drive unit and the second drive unit are driven and the dropped gob is pinched between the first mold and the second mold and the gob is shaped to have a predetermined thickness, while it is rapidly cooled. Then, after the press unit is moved to the retreat position, the first mold and the second mold are separated and the formed glass blank is dropped. Under the retreat positions of the press units 120, 130, 140, and 150, a first conveyor 171, a second conveyor 172, a third conveyor 173, and a fourth conveyor 174 are provided, respectively. Each of the first conveyor 171 through the fourth conveyor 174 receives the glass blank B falling from the corresponding one of press units and transfers the glass blank B to a device, which is not shown in the figures, for the successive process.

In this embodiment, since the press units 120, 130, 140, and 150 are configured to move in turn to the catch position, and to pinch the gob and move to the retreat positions, it is possible to form the glass bank B continuously, without waiting for the glass blank B to be cooled at each press unit.

Figure 2A:
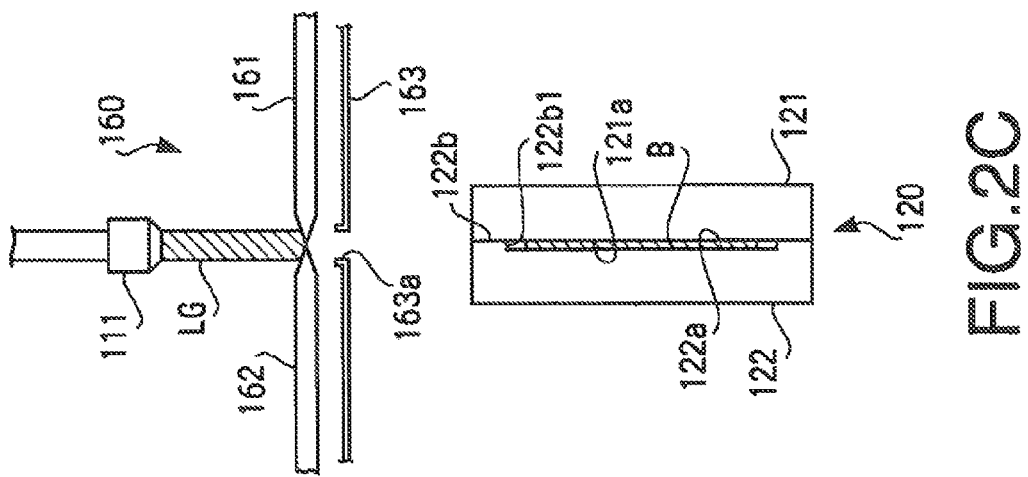
FIGS. 2A, 2B, and 2C are side views of a surrounding area of a press unit of the glass blank manufacturing apparatus according to the first embodiment of the present invention.
Figure 2B:
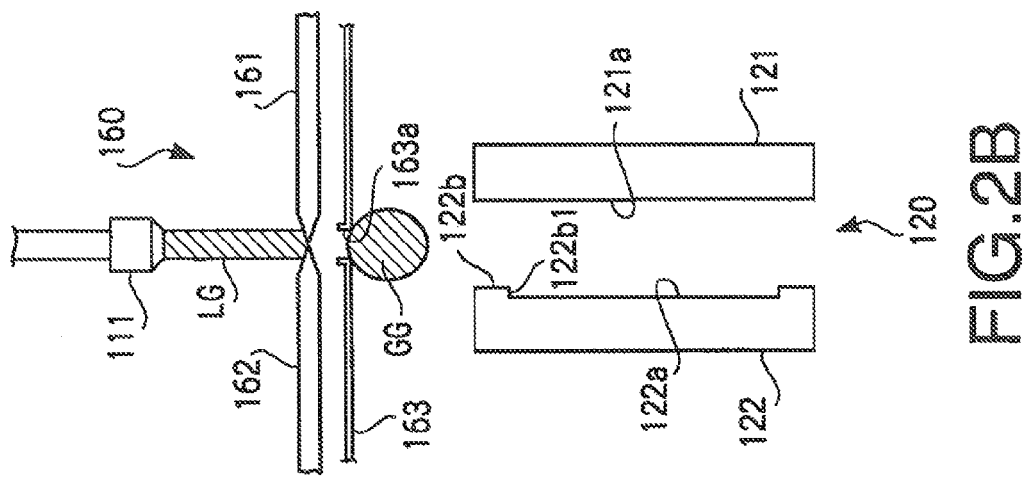
Figure 2C:
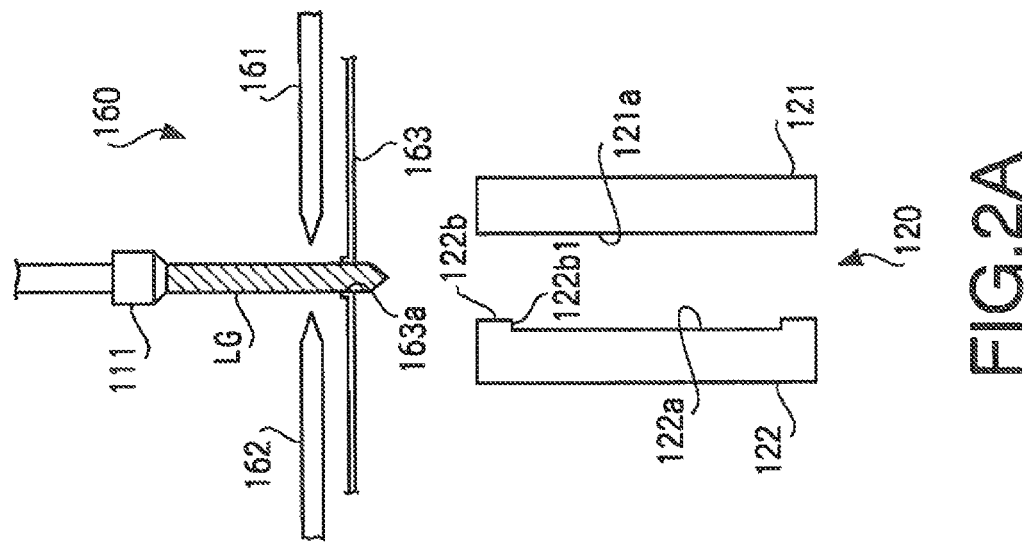

Next, a manufacturing procedure of the glass blank B with the press unit is explained. FIGS. 2A, 2B, and 2C are side views of a surrounding area of the press unit 120 of the glass blank manufacturing apparatus 101 according to this embodiment. The FIG. 2A is a diagram indicating a state prior to forming the gob. The FIG. 2B is a diagram indicating a state where the gob is formed with the cutting unit 160. The FIG. 2C is a diagram indicating a state where the gob is pressed and the glass blank B is formed.

As indicated in FIG. 2 (a), a molten glass material LG is continuously discharged from the molten glass outlet 111. Then, the cutting unit 160 is driven at predetermined timings, and the molten glass material LG is cut with the cutting blades 161 and 162 (FIG. 2B). The molten glass material which has been cut becomes a substantially spherical gob GG. In this embodiment; an amount of the molten glass material LG discharged per unit time and a time interval for driving the cutting unit 160 are adjusted so that the gob GG of an amount corresponding to a sphere of a radius about 10 mm is formed, each time the cutting unit 160 is driven.

In addition, as shown in FIGS. 2A-2C, a cover 163 is placed below the cutting blades 161 and 162. The cover 163 includes an aperture 163a having a diameter which is substantially equal to the diameter of the molten glass material LG. The gob GG is formed with only the molten glass material LG which have been cut by the cutting blades 161 and 162 and which have passed the aperture 163a. Each of the press units 120-150 are protected by the cover 163 from droplets of the molten glass material LG produced at the time of cutting.

The formed gob GG drops towards a gap between the first mold 121 and the second mold 122 of the press unit 120. The first drive unit 123 and the second drive unit 124 (FIG. 1) are driven so that the first mold 121 and the second mold 122 become close to each other at a timing when the gob GG goes into the gap between the first mold 121 and the second mold 122. Then, as shown in FIG. 2C, the gob GG is caught between the first mold 121 and the second mold 122, and an inner surrounding surface 121a of the first mold 121 and an inner surrounding surface 122a of the second mold 122 are in a state in which they are adjacent to each other with a predetermined small distance corresponding to the thickness of the glass blank, thereby forming the gob GG, which is pinched between the inner surrounding surface 121a of the first mold 121 and the inner surrounding surface 122a of the second mold 122, into a thin plate-like shape. In addition, in order to keep the distance between the inner surrounding surface 121a of the first mold 121 and the inner surrounding surface 122a of the second mold 122 at a constant distance, a spacer 122b shaped line a protrusion is provided on the inner surrounding surface 122a of the second mold 122. Namely, the distance between the inner surrounding surface 121a of the first mold 121 and the inner surrounding surface 122a of the second mold 122 is kept at the constant distance through contacting the spacer 122b of the second mold 122 with the inner surrounding surface 121a of the first mold 121. Further, as shown in FIG. 2C, during the process of forming the glass blank B by pressing the gob GG; the glass material contacts only with the inner surrounding surfaces 121a and 122a of the first mold 121 and the second mold 122, and the glass material does not contact with an inner surrounding surface 122b1 of the spacer 122b.

For the first mold 121 and the second mold 122, temperature adjusting means, not shown in the figures, are provided. The temperatures of the first mold 121 and the second mold 122 are kept at sufficiently lower temperatures than the glass transition temperature TG of the molten glass LG, so as to prevent them from adhering to the molten glass. In addition, in this embodiment, a time interval from the time when the gob GG contacts with the inner surrounding surface 121a of the first mold 121 and the inner surrounding surface of the second mold 122, after the first drive unit 123 and the second drive unit 124 are driven, to the time at which the first mold 121 and the second mold 122 are completely closed (the state in which the spacer 122b contacts with the surrounding surface 121a of the first mold 121) is an extremely short time interval of about 0.06 second. Therefore, the gob GG spreads along the inner surrounding surface 121a of the first mold 121 and the inner surrounding surface 122a of the second mold 122 and is shaped in a disk-like shape, while it is rapidly cooled and solidified as an amorphous glass, thereby forming the glass blank B. In addition, in this embodiment, the formed glass blank B is a disk with a diameter of 75 mm-80 mm and a thickness of about 1 mm.

In this embodiment, the temperatures of the first mold 121 and the second mold 122 are kept at the sufficiently lower temperatures than the glass transition temperature TG of the molten glass LG with the temperature adjusting means, as described above. However, the present invention is not limited by the above described configuration. The first mold 121 and the second mold 122 can be configured such that the temperatures of the first mold 121 and the second mold 122 are kept at lower temperatures only by natural heat dissipation.

In this embodiment, the inner surrounding surfaces 121a and 122a, which contact with the molten glass LG in the first mold 121 and the second mold 122, are shaped in a substantially round shape. In addition, diameters of the first mold 121 and the second mold 122 are about 100 mm, so as to enable manufacturing of the glass blank of the above described dimension. Namely, a ratio between the diameter of the first mold 121 and the second mold 122 and the distance between the inner surrounding surfaces 121a and 122a of the first and the second molds 121 and 122 (namely, a height of the spacer 122b, and the thickness of the glass blank) is about 100:1.

Further, the ratio between the diameter of the first and second molds 121 and 122 and the distance between the inner surrounding surfaces 121a and 122a of the first and the second molds 121 and 122 at the time of pressing is not limited by the above value, and it suffices that if the ratio is in a range of 50:1-150:1.

After the first mold 121 and the second mold 122 are closed, the press unit 120 quickly moves to the retreat position. In turn, the another press unit 130 moves to the catch position, and the pressing of the gob GG is performed with the press unit 130.

The first mold 121 and the second mold 122 maintain the closed state until the glass blank B is sufficiently cooled (at least the temperature becomes lower than the deformation point TS), after the press unit 120 moves to the retreat position. After that, the first drive unit 123 and the second drive unit 124 are driven and the first mold 121 and the second mold 122 are separated, and the glass blank B is separated from the press unit 120 and drops, and it is received by a first conveyor 171 placed below (FIG. 1).

In this embodiment, as described above, the first mold 121 and the second mold 122 are closed in the very small time interval of within 0.1 second (about 0.06 second), and the molten glass material contacts with the whole of the inner surrounding surface 121a of the first mold 121 and the whole of the inner surrounding surface 122a of the second mold 122 at substantially the same time. Therefore, the inner surrounding surface 121a of the first mold 121 and the inner surrounding surface 122a of the second mold 122 are not heated locally. Thus, almost no deformation arises on the inner surrounding surface 121a of the first mold 121 and on the inner surrounding surface 122a of the second mold 122. In addition, since the molten glass material is shaped in a disk-like-shape prior to the heat moving from the molten glass material to the first mold 121 and the second mold 122, a temperature distribution on the disk-like shaped molten glass material becomes substantially uniform. Thus, the shrinkage ratio of the glass does not change locally and no deformation arises on the glass blank B, during cooling of the molten glass material.

Therefore, with the glass blank manufacturing apparatus 101, a glass blank such that flatnesses of a first surface and a second surface of the glass blank and parallelism of the first surface and the second surface of the glass blank are extremely high, and such that surface roughness of the first surface and the second surface of the glass blank is close to the surface roughness of the first mold 121 and the second mold 122, can be manufactured.

Further, as described above, in this embodiment, the substantially spherical gob GG is formed through cutting the molten glass material LG which flows out with the cutting blades 161 and 162. However, when viscosity of the molten glass material LG is small with respect to a required volume, the glass material which, have been cut does not become substantially spherical only by cutting the molten glass material LG, and the gob GG is not formed. In such a case, a gob forming mold for forming the gob is used concurrently. FIGS. 3A, 3B, and 3C are side views of a surrounding area of the press unit 120 of the glass blank manufacturing apparatus according to another example of the present invention in which the gob forming mold is used. FIG. 3A is a figure showing a state prior to forming the gob. FIG. 3B is a figure showing a state in which the gob is formed with the cutting unit 160 and the gob forming mold 180. FIG. 3C is a figure showing a state in which the glass blank is formed through pressing the gob.

As shown in FIGS. 3A, 3B, and 3C, the gob forming mold 180 is placed between the cutting unit 160 and the press unit 120 which is placed at the catch position. The gob forming mold 180 is a block-like assembly such that a semispherical concaved portion 180C is formed at its upper portion. The gob forming portion can be separated into two pieces of left and right blocks 182 and 181, while centered by the concaved portion 180C. Further, a driving means, which is not shown in the figures, is provided for the gob forming mold 180. The driving means causes the blocks 181 and 182 to move so that a state in which the blocks 181 and 182 are closely-attached and the concaved portion 180C is formed (FIG. 3A) and a state in which the blocks 181 and 182 are separated (FIGS. 3A and 3C) are switched alternatively. In addition, temperatures of the blocks 181 and 182 are regulated so that these temperatures are close to the transition point of the molten glass material LG.

In the state of FIG. 3A, the cutting blades 161 and 162 of the cutting unit 160 are sufficiently separated, and, the blocks 181 and 182 of the gob forming mold 180 are closely-attached and forming the concaved portion 180C. In this state, the molten glass material LG which is continuously flowing out from the molten glass outlet 111 is received by the concaved portion 180C of the gob forming mold 180.

Next, the cutting unit is driven at a predetermined timing, and the molten glass material LG is cut with the cutting blades 161 and 162 (FIG. 3C). Further, the blocks 181 and 182 are moved to be separated each other. Then, the molten glass material supported by the concaved portion 180C of the gob forming mold 180 is dropped at once, and the spherical gob GG is formed with a surface tension of the molten glass material. In this embodiment, an amount of the molten glass material flowing out per unit time and time intervals for driving the cutting unit 160 and the gob forming mold 180 are adjusted so that the gob GG with the radius of about 10 mm is formed, each time the cutting unit 160 and the gob forming mold 180 are driven.

The formed gob GG drops toward the gap between the first mold 121 and the second mold 122 of the press unit 120. Then, the first drive unit 123 and the second drive unit 124 (FIG. 1) are driven so that the first mold 121 and the second mold 122 become close to each other, at a timing when the gob GG goes into the gap between the first mold 121 and the second mold 122. As shown in FIG. 3C, the gob GG is caught between the first mold 121 and the second mold 122, and the inner surrounding surface 121a of the first mold 121 and the inner surrounding surface 122a of the second mold 122 are in a state in which they are at a close proximity and separated by a very small distance. Thus, the gob GG pinched between the inner surrounding surface 121a of the first mold 121 and the inner surrounding surface 122a of the second mold 122 is shaped like a thin plate. Further, as shown in FIG. 3C, in the process of forming the glass blank B by pressing the gob GG, the glass material contacts only with the inner surrounding surfaces 121a and 122a of the first and the second molds 121 and 122, and the glass material does not contact with the inner surrounding surface 122b1 of the spacer 122b.

In the first embodiment of the present invention explained above, the respective plurality of press units 120, 130, 140, and 150 reciprocate in turn and catch the gob G one after another. Thus, many more glass blanks B can be manufactured in a short time, without wasting the molten glass material LG, even though the configuration is such that the molten glass material LG is continuously flowing out from the molten glass outlet 111. However, the present invention is not limited to the above described configuration. The present invention can be configured such that a plurality of press units catch the gob GG one after another, while the plurality of press units move on a predetermined circle, as in configurations of a second and a third embodiment of the present invention explained below. Alternatively, the present invention can be configured such that, when one of the plurality of press units moves from the retreat position to the catch position, another press unit which has completed catching of the gob GG goes back to the retreat position, as in a configuration of a fourth embodiment of the present invention described later.

Figure 4:
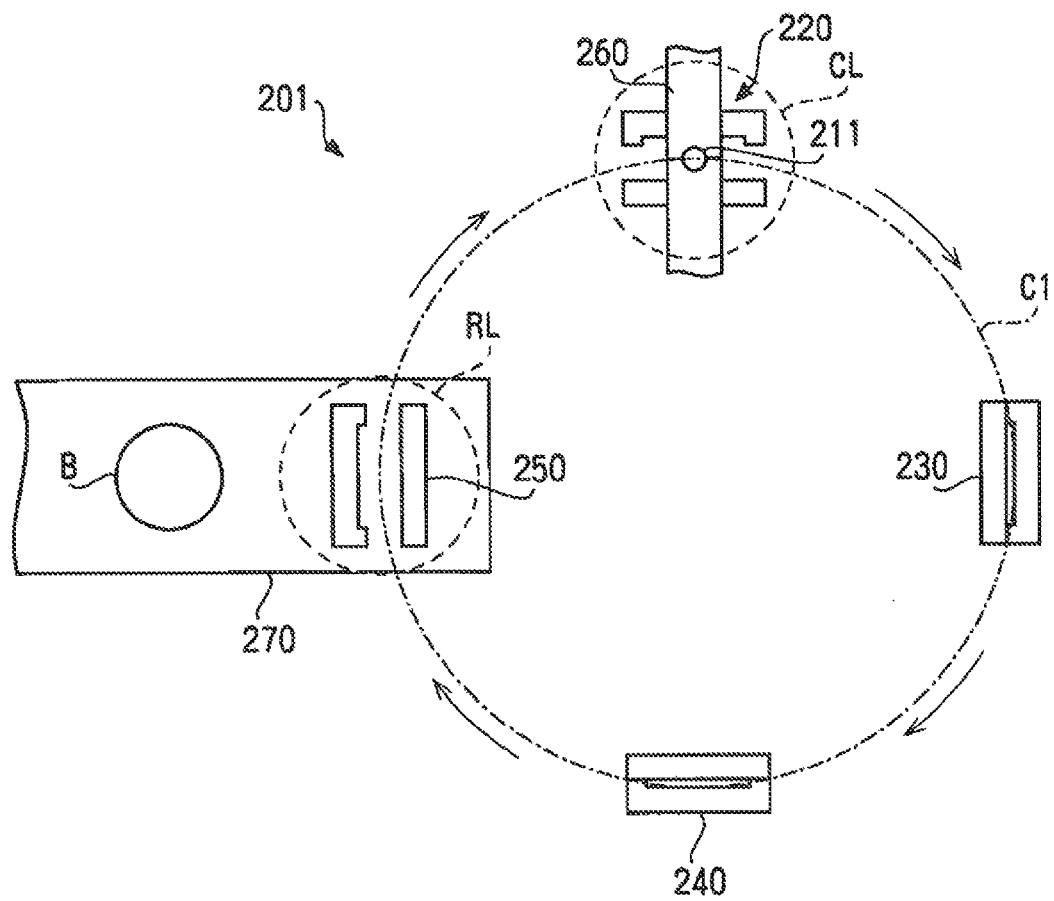
FIG. 4 is a top view of a glass blank manufacturing apparatus according to a second embodiment of the present invention.

FIG. 4 is a plain view of the glass blank manufacturing apparatus according to the second embodiment of the present invention. The glass blank manufacturing apparatus 201 according to this embodiment includes four press units 220, 230, 240, and 250 which orbit on a circle C1 defined on a horizontal surface. As shown in FIG. 4, the press units 220, 230, 240, and 250 are evenly spaced apart by 90 degrees on the circle C1, and are driven by a press unit orbiting means, which is not shown in the figure, so that the press units 220, 230, 240, and 250 orbit on the circle C1 with a constant velocity in an integrated manner, while retaining the respective distances between the neighboring press units. Further, in this embodiment, the number of the press units is four, but the number is not limited to this number. The number of the press units is determined appropriately, depending on how many glass blanks are manufactured within a predetermined time.

A molten glass outlet 211 is provided above a catch position CL which is a point on the circle C1. The molten glass outlet 211 continuously discharges a molten glass material downwardly, similarly as the molten glass outlet 111 of the first embodiment. In addition, a cutting unit 260 for forming a gob of the molten glass material is provided between the molten glass outlet 211 and the catch position CL. The cutting unit 260 is for cutting the molten glass material with two pieces of cutting blades, similarly as the cutting unit 160 (FIGS. 2A-2C) of the first embodiment. Further, the glass blank manufacturing apparatus can be configured such that the gob is formed of a glass material having low viscosity using a gob forming mold concurrently, as in the other example (FIGS. 3A-3C) of the first embodiment of the present invention.

In this embodiment, the cutting unit 260 (or the gob forming mold) is regulated so as to form the gob at a time when one of the press units 220, 230, 240, and 250 is at the catch position CL. In this embodiment, a disk-shaped glass blank B is formed by catching and pinching the falling gob with a pair of molds provided with each of the press units 220, 230, 240, and 250, as in the first embodiment.

Each of the press units 220, 230, 240, and 250, which catches the gob at the catch position CL, orbits on the circle C1 while closing the molds of the press unit, thereby cooling the glass blank B. Then, at a release position RL, where the press unit has been moved about 270 degrees from the catch position CL, the pair of molds of each of the press units is opened and the glass blank B is dropped. A conveyor 270 is provided below the release position RL for receiving the falling glass blank and transferring the glass blank toward a next process.

Figure 5:
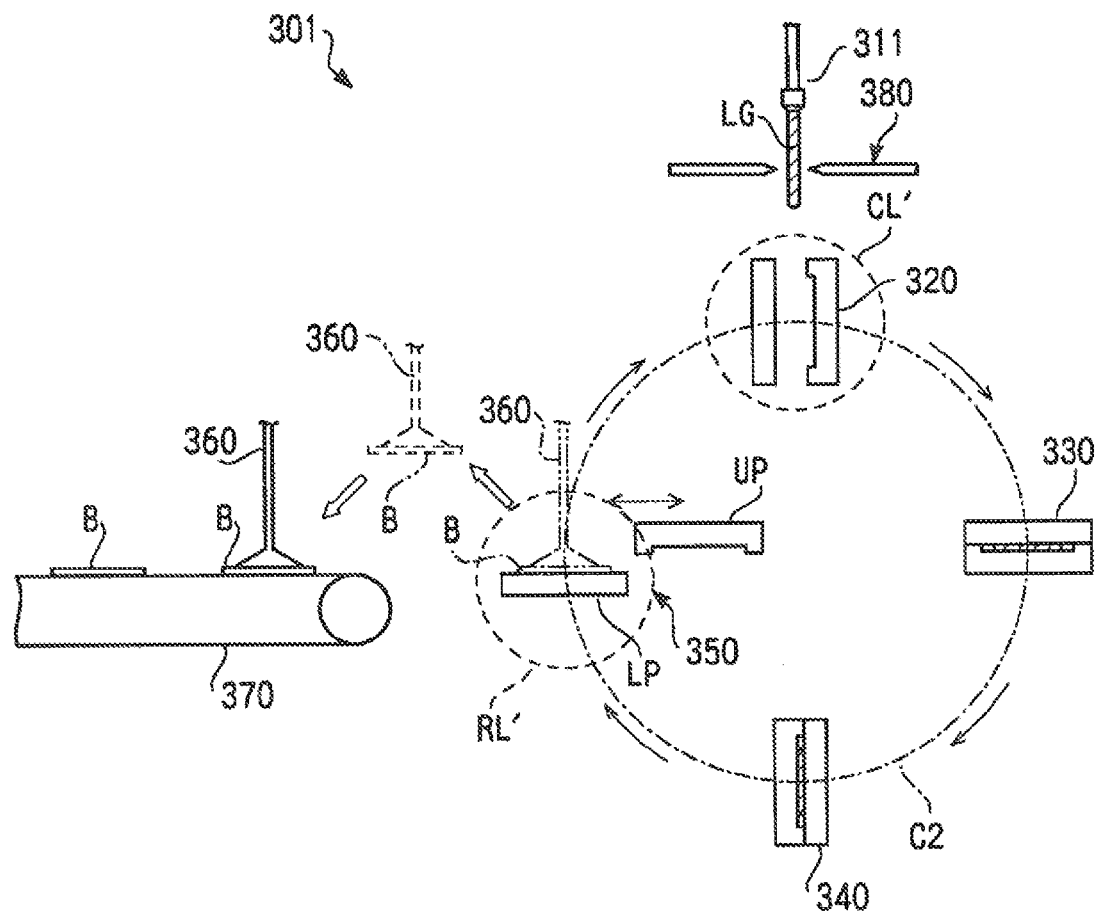
FIG. 5 is a side view of a glass blank manufacturing apparatus according to a third embodiment of the present invention.

Next, the third embodiment of the present invention is explained. FIG. 5 is a side view of a glass blank manufacturing apparatus 301 of this embodiment. The glass blank manufacturing apparatus 301 includes four press units 320, 330, 340, and 350, which orbit on a circle C2 defined on a vertical surface. As shown in FIG. 5, the press units 320, 330, 340, and 350 are evenly spaced apart by 90 degrees on the circle C2, and are driven by a press unit orbiting means, which is not shown in the figure, so that the press units 320, 330, 340, and 350 orbit on the circle C2 with a constant velocity in an integrated manner, while retaining the respective distances between the neighboring press units. Further, also in this embodiment, the number of the press units is not limited to four, and the number of the press units is determined appropriately, depending on how many glass blanks are manufactured within a predetermined time.

A molten glass outlet 311 is provided above a catch position CL' which is a point on the circle C2. The molten glass outlet 311 continuously discharges a molten glass material LG downwardly, similarly as the molten glass outlet 111 of the first embodiment. In addition, a cutting unit 380 for forming a gob of the molten glass material is provided between the molten glass outlet 311 and the catch position CL'. The cutting unit 380 is for cutting the molten glass material with two pieces of cutting blades, similarly as the cutting unit 160 (FIGS. 2A-2C) of the first embodiment. Further, the glass blank manufacturing apparatus can be configured such that the gob is formed of a glass material having low viscosity using a gob forming mold concurrently, as in the other example (FIGS. 3A-3C) of the first embodiment of the present invention.

In this embodiment, the cutting unit 380 (or the gob forming mold) is regulated so as to form the gob at a time when one of the press units 320, 330, 340, and 350 is at the catch position CL'. In this embodiment, a disk-shaped glass blank B is formed by catching and pinching the falling gob with a pair of molds provided with each of the press units 320, 330, 340, and 350, as in the first embodiment.

Each of the press units 320, 330, 340, and 350, which catches the gob at the catch position CL', orbits on the circle C2 while closing the molds of the press unit, thereby cooling the glass blank B. Then, at a release position RL', where the press unit has been moved about 270 degrees, the pair of molds of each of the press units is opened. In this embodiment, a driving mechanism, not shown in the figure, is provided for moving a mold UP, which becomes an upper side at the release position RL', in the horizontal direction. By moving the mold UP in the horizontal direction at the release position RL', the glass blank B placed on a mold LP, which becomes a lower side at the release position RL', becomes accessible from above. In the upward direction of the release position RL', a suction mechanism 360 is provided. The suction mechanism 360 sucks the glass blank B on the mold LP and pulls the glass blank B upwardly. Then, the suction mechanism 360 transfers the glass blank B onto a conveyor 370 provided in proximity with the release position RL'. The glass blank B transferred on the conveyor 370 by the suction mechanism 360 is transferred toward a next process by the conveyor 370.

Figure 6:
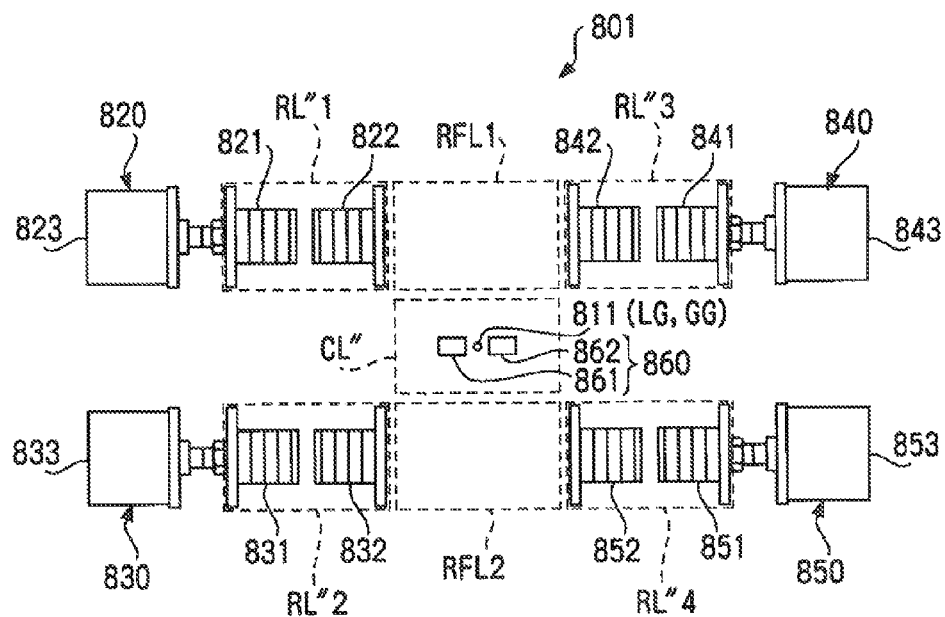
FIG. 6 is a top view of an initial state of a glass blank manufacturing apparatus according to a fourth embodiment of the present invention.

Next, the fourth embodiment of the present invention is explained. FIG. 6 is a top view of a glass blank manufacturing apparatus 801 of this embodiment. The glass blank manufacturing apparatus 801 includes a first press unit 820, a second press unit 830, a third press unit 840, and a fourth press unit 850.

At an initial condition (a condition where a sequence of press shaping processes are not performed), the first press unit 820, the second press unit 830, the third press unit 840, and the fourth press unit 850 are placed at a first release position RL"1, a second release position RL"2, a third release position RL"3, and a fourth release position RL"4, respectively, and are configured such that a molten glass outlet 811 is positioned at a center of the first release position RL"1, the second release position RL"2, the third release position RL"3, and the fourth release position RL"4. In addition, as shown in FIG. 6, the respective release positions are defined such that the first release position RL"1 and the forth release position RL"4, and, the second release position RL"2 and the third release position RL"3, are pairs of opposing corners of a rectangle centered by the molten glass outlet 811, respectively. Further, a first retreat position RFL1 is defined between the first release position RL"1 and the third release position RL"3, and a second retreat position RFL2 is defined between the second release position RL"2 and the fourth release position RL"4. Additionally, a catch position CL" is defined directly below the molten glass outlet 811.

The glass blank manufacturing apparatus 801 includes a press unit moving means (not shown in the figure) for moving the first through the fourth press units 820-850. The first press unit 820 is movable in between the first release position RL"1 and the first retreat position RFL1, and in between the first retreat position RFL1 and the catch position CL", with the press unit moving means. The second press unit 830 is movable in between the second release position RL"2 and the second retreat position RFL2, and in between the second retreat position RFL2 and the catch position CL", with the press unit moving means. The third press unit 840 is movable in between the third release position RL" and the first retreat position RFL1, and in between the first retreat position RFL1 and the catch position CL", with the press unit moving means. The fourth press unit 850 is movable in between the fourth release position RL" and the second retreat position RFL2, and in between the second retreat position RFL2 and the catch position CL", with the press unit moving means.

In this embodiment, similarly as in other embodiments, a gob GG is formed by cutting a molten glass material LG with a cutting unit 860 including cutting blades 861 and 862. Then, the gob GG is caught by one of the first through the fourth press units 820-850 and is press-shaped, and a glass blank B is obtained. When the glass blank B is press-shaped, one of the first through the forth press units 820-850 is moved to the catch position CL", and catches the gob GG.

The first press unit 820 includes a movable mold 821, a fixed mold 822, and an actuator 823. The actuator 823 is configured to cause the movable mold 821 to move back and forth with respect to the fixed mold 822 with a solenoid or an air cylinder mechanism. As shown in FIG. 6, in a state in which the movable mold 821 is separated from the fixed mold 822, the gob GG can go through in between the movable mold 821 and the fixed mold 822. On the other hand, when the movable mold 821 is moved toward the fixed mold 822 in a direction in which the molds come close from the state in which the movable mold 821 is separated from the fixed mold 822, the gob GG can be pressed between the movable mold 821 and the fixed mold 822. In addition, although it is not shown in the figure, a spacer for defining a space (and parallelism), when the movable mold 821 and the fixed mold 822 come close, is included in one of the movable mold 821 and the fixed mold 822.

Further, the second press unit 830, the third press unit 840, and the fourth press unit 850 include movable molds (831, 841, and 851), fixed molds (832, 842, and 852), and actuators (833, 843, 853), respectively, similarly as the first press unit 820.

Figure 7:
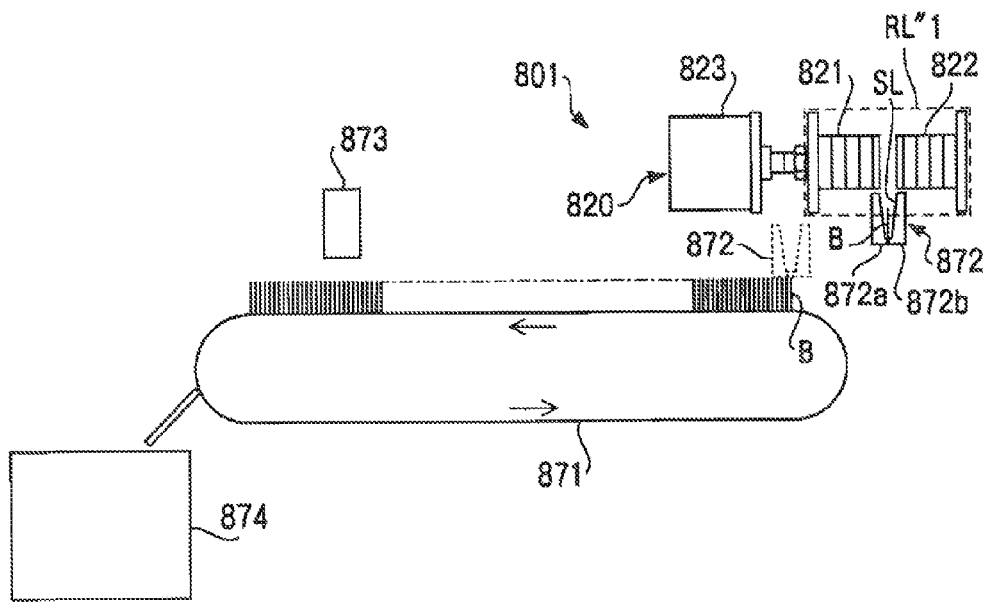
FIG. 7 is a side view of the glass blank manufacturing apparatus according to the fourth embodiment of the present invention.

FIG. 7 is a side view of the glass blank manufacturing apparatus 801 at a neighboring area of the first release position RL"1. As shown in FIG. 7, a conveyor 871, a cooling unit 873, and a product collecting box 874 are provided below the first release position RL"1. In addition, a guide 872 for receiving the glass blank B from the first press unit 820 and transferring the glass blank B onto the conveyor 871 is provided in the neighboring area of the first release position RL"1.

As shown in FIG. 7, the guide 872 includes a pair of guide plates 872a and 872b. A protruding portion which protrudes toward the guide plate 872b is formed at a lower part of the guide plate 872a. Similarly, a protruding portion which protrudes toward the guide plate 872b is formed at a lower part of the guide plate 872b. In a state in which the guide plates 872a and 872b come close and the respective protruding portions are confronting to each other (the solid-lined part in FIG. 7), a slot SL is formed of two facing surfaces of the guide plate 872a and 872b and the protruding portions.

The guide 872 is driven by a guide moving means (not shown in the figure), and is movable in between a part directly below the movable mold 821 and the fixed mold 822 (the solid-lined part in FIG. 7) at a time when the first press unit 820 is placed at the first release position RL" and an upper side above one end side of the conveyor 871 (the dash-lined part in FIG. 7). In addition, the guide plates 872a and 872b are driven by a guide opening and closing means (not shown in the figure) in the direction in which they come close to each other or in the direction in which they are separated from each other.

When the guide 872 is placed directly below the press unit 820 with a state in which the guide plates 872a and 872b come close (namely, the slot SL is formed), the guide 872 can receive the glass blank B dropping from the first press unit 820 and store the glass blank B inside of the slot SL. The glass blank B which has been stored in the slot SL falls from the guide 872, when the guide 872 is moved to immediately above the conveyor 871 while storing the glass blank B inside of the slot SL and after that the guide plate 872a and 872b are separated from each other (the dash-lined part in the figure). The glass blank B is placed on the conveyor 871 with a state in which the glass blank B is standing up on the conveyor 871. Additionally, on a surface of the conveyor 871, a receiving part (not shown in the figure) is formed per constant distance. The conveyor 871 is configured to vertically support one glass blank B, which fell from the guide 872, per constant distance.

As shown in FIG. 7, the surfaces of the guide plates 872a and 872b which are facing to each other are slanted surfaces, and the slot SL is shaped such that it become wider in the upward direction. Since a width of an aperture at a top end of the slot SL is sufficiently wide with respect to a thickness of the glass blank B as described above, the glass blank B falling from the press unit 820 can be certainly stored inside of the slot SL, without conducting fine positioning of the guide 872 and the first press unit 820. On the other hand, since a width of a lower end of the slot SL is narrow, the glass blank B can be dropped on an accurate position on the conveyor 871.

The conveyor 871 transfers the glass blank B which is put on it at a constant speed. The cooling unit 873 is provided above the conveyor 871. The cooling unit 873 is to form an air curtain by blowing air toward the upper surface of the conveyor 871. The glass blank B is cooled when the glass blank B which is transferred by the conveyor 871 passes through the air curtain, and an internal deformation is removed. The product collecting box 874 is provided at the other end of the conveyor 871. The glass blank B which is transferred to the other end of the conveyor 871 drops from the conveyor 871, and the glass blank B is stored in the product collecting box 874.

Additionally, the conveyor 871, the guide 872, the cooling unit 873, and the product collecting box 874 are provided at each of the first release position RL"1, the second release position RL"2, the third release position RL"3, individually. The glass blanks B pressed by the first press unit 820 through the fourth press unit 850, respectively, are stored in the respective individual product collecting boxes 874.

Next, manufacturing procedures of the glass blank B with the glass blank manufacturing apparatus of this embodiment are explained using top views of FIG. 8-FIG. 18. Further, in the initial condition shown in FIG. 6, all of the movable molds 821-851 of the first press unit 820—the fourth press unit 850 are separated from the fixed molds 822-852, and the gob GG can pass through each of the gaps.

Figure 8:
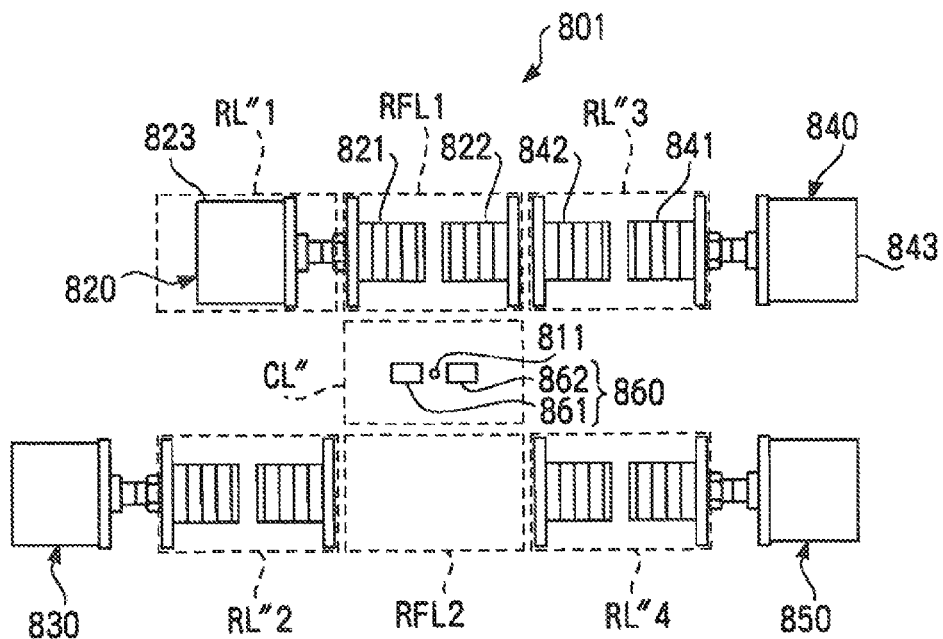
FIG. 8 is a top view of the glass blank manufacturing apparatus at a first step, according to the fourth embodiment of the present invention.

The first press unit 820 is moved from the initial condition shown in FIG. 6 to the first retreat position RFL1, and a state becomes a condition shown in FIG. 8 (first step).

Figure 9:
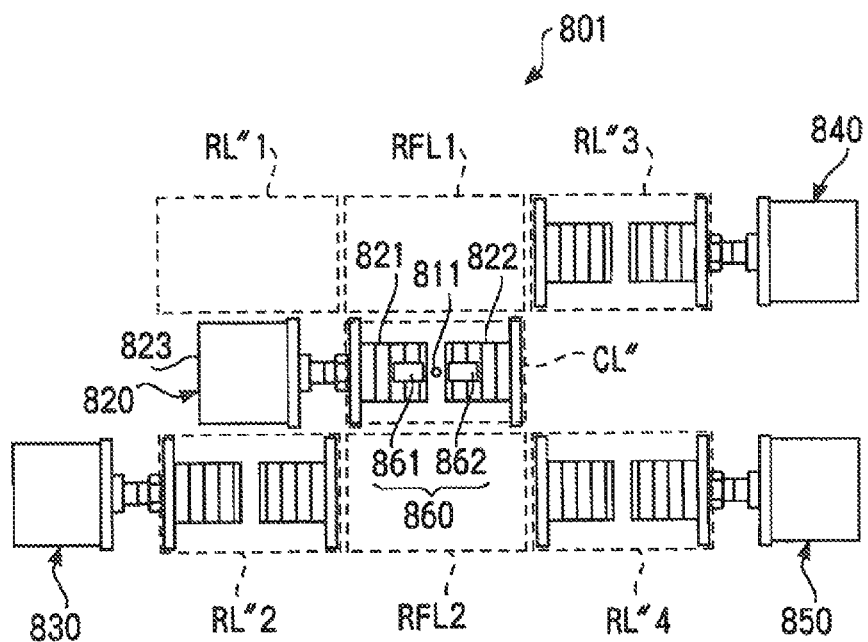
FIG. 9 is a top view of the glass blank manufacturing apparatus at a second step, according to the fourth embodiment of the present invention.

Then, the first press unit 820 is moved to the catch position CL" and a state becomes a condition shown in FIG. 9 (second step). In this state, the gap between the movable mold 821 and the fixed mold 822 of the first press unit 820 are positioned directly below the molten glass outlet 811.

Figure 10:
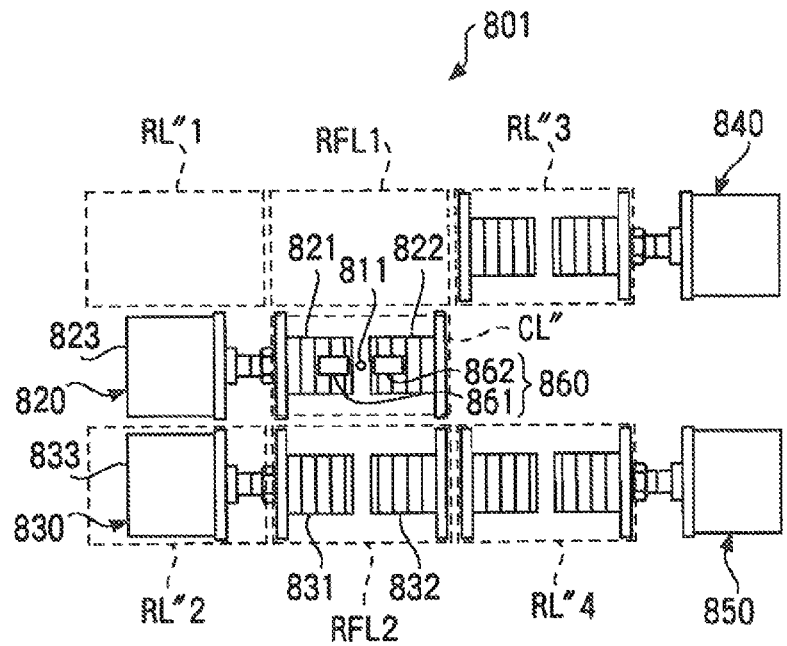
FIG. 10 is a top view of the glass blank manufacturing apparatus at a third step, according to the fourth embodiment of the present invention.

Then, the second press unit 830 is moved to the second retreat position RFL2, and a state becomes a condition shown in FIG. 10 (third step). The gob GG is formed by the cutting unit 860 and the gob GG drops toward the gap between the movable mold 821 and the fixed mold 822, after the second press unit 830 moved to the second retreat position RFL2. Further, similarly as the first embodiment shown in FIGS. 2A-2C, when the falling gob GG goes into the gap between the movable mold 821 and the fixed mold 822, the actuator 823 moves the movable mold 821 toward the fixed mold 822. The gob GG is caught and pressed in between the movable mold 821 and the fixed mold 822, thereby forming the glass blank B.

Figure 11:
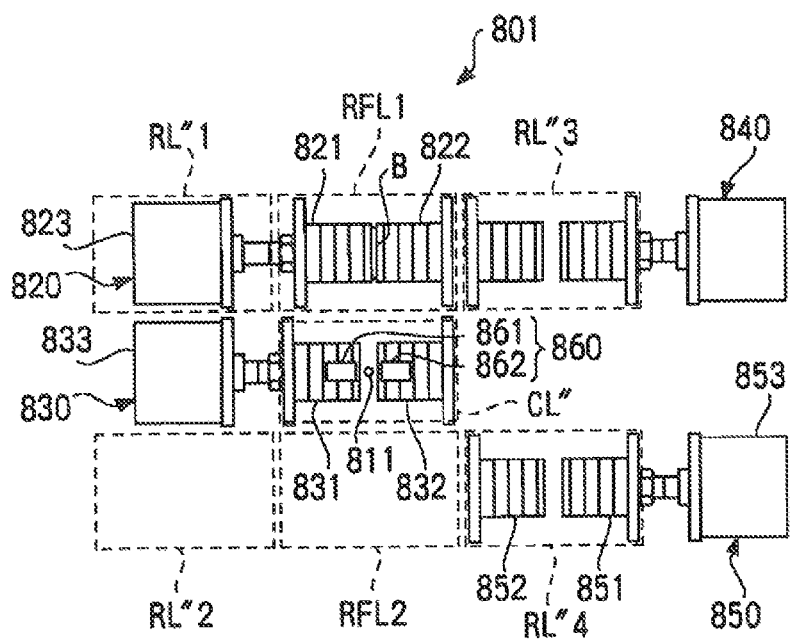
FIG. 11 is a top view of the glass blank manufacturing apparatus at a fourth step, according to the forth embodiment of the present invention.

Then, the first press unit 820 is moved to the first retreat position RFL1 and, at the same time, the second press unit 830 is moved to the catch position CL", and a state becomes a condition shown in FIG. 11 (fourth step). After that, the gob GG is formed by the cutting unit 860, and the gob GG drops toward the gap between the movable mold 831 and the fixed mold 832 of the second press unit 830. The actuator 833 moves the movable mold 831 toward the fixed mold 832, when the gob GG goes into the gap between the movable mold 831 and the fixed mold 832, and the gob GG is caught and pressed in between the movable mold 831 and the fixed mold 832, thereby forming the glass blank B.

Figure 12:
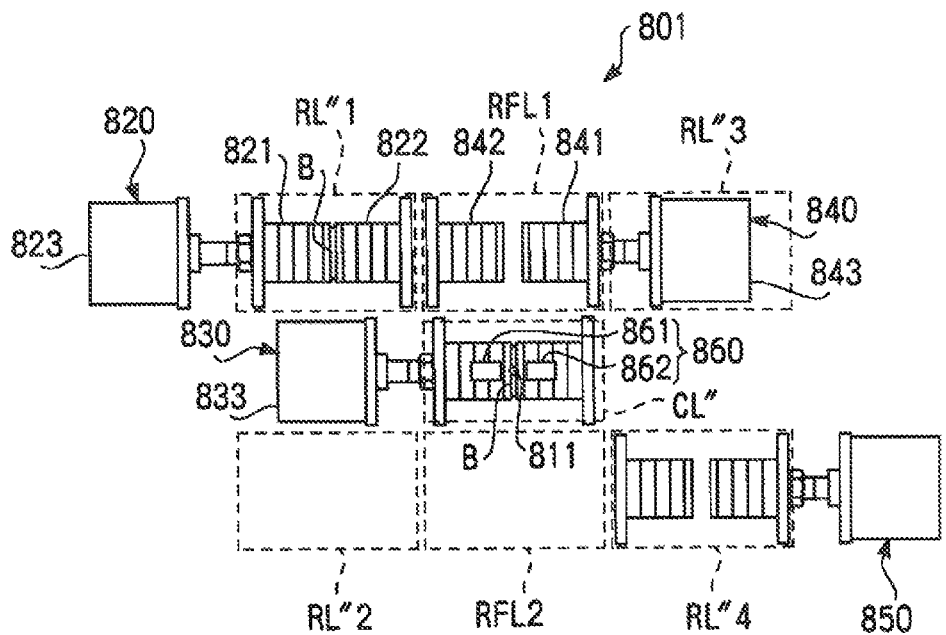
FIG. 12 is a top view of the glass blank manufacturing apparatus at a fifth step, according to the fourth embodiment of the present invention.

Then, the first press unit 820 is moved to the first release position RL"1 and, at the same time, the third press unit 840 is moved to the first retreat position RFL1, and a state becomes a condition shown in FIG. 12 (fifth step). After that, the actuator 823 of the first press unit 820 separates the movable mold 821 from the fixed mold 822, and causes the glass blank B to be dropped onto the guide 872 (FIG. 7). Then, as described above, the guide 872 moves the glass blank B to the conveyor 871.

Figure 13:
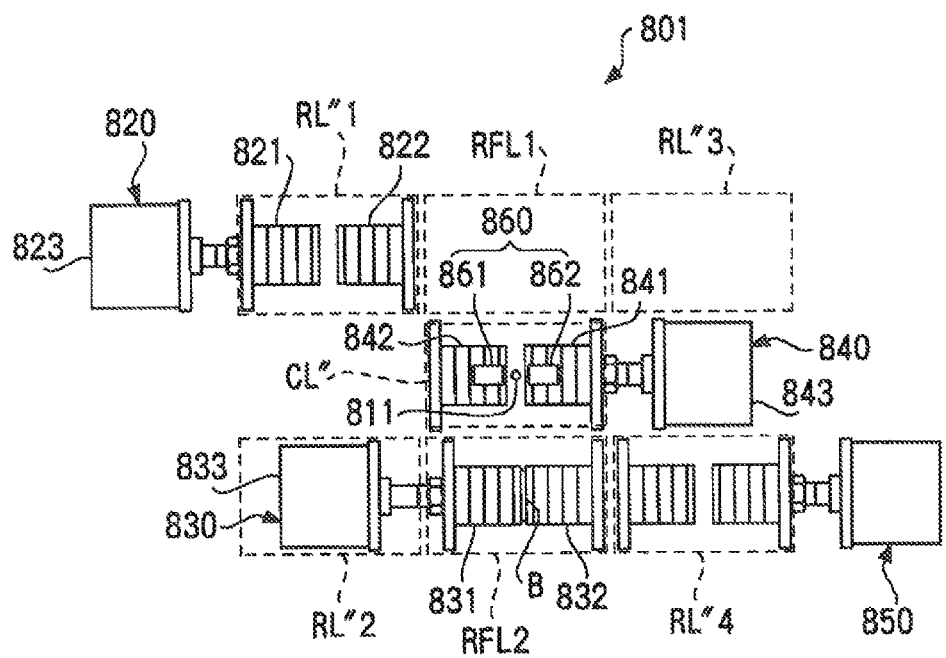
FIG. 13 is a top view of the glass blank manufacturing apparatus at a sixth step, according to the fourth embodiment of the present invention.

Then, the second press unit 830 is moved to the second retreat position RFL2 and, at the same time, the third press unit 840 is moved to the catch position CL", and a state becomes a condition shown in FIG. 13 (sixth step). After that, the gob GG is formed by the cutting unit 860, and the gob GG drops toward the gap between the movable mold 841 and the fixed mold 842 of the third press unit 840. The actuator 843 moves the movable mold 841 toward the fixed mold 842, when the gob GG goes into the gap between the movable mold 841 and the fixed mold 842, and the gob GO is caught and pressed in between the movable mold 841 and the fixed mold 842, thereby forming the glass blank B.

Figure 14:
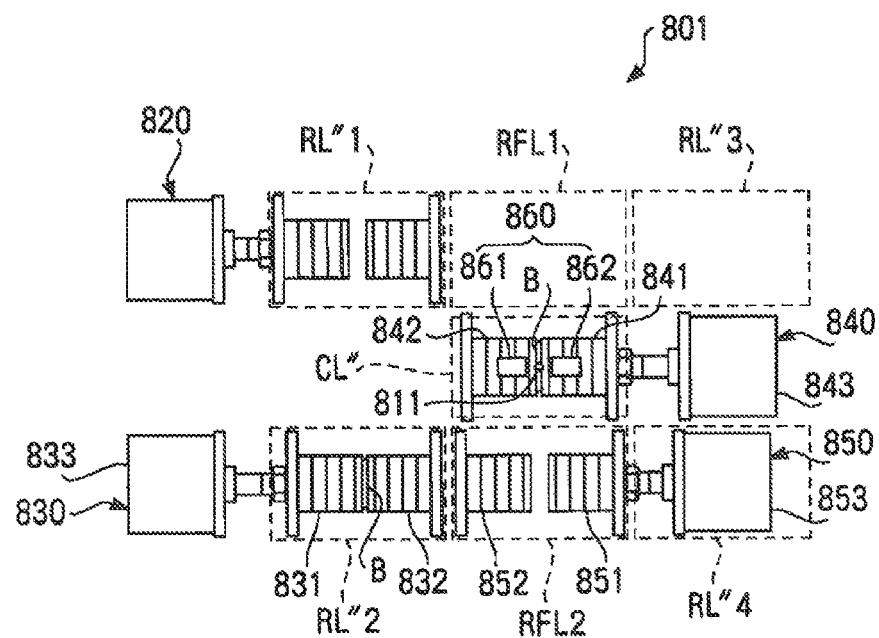
FIG. 14 is a top view of the glass blank manufacturing apparatus at a seventh step, according to the fourth embodiment of the present invention.

Then, the second press unit 830 is moved to the second release position RL" and, at the same time, the fourth press unit 850 is moved to the second retreat position RFL2, and a state becomes a condition shown in FIG. 14 (seventh step). After that, the actuator 833 of the second press unit 830 separates the movable mold 831 from the fixed mold 832, and causes the glass blank B to be dropped onto the guide 872 (FIG. 7).

Figure 15:
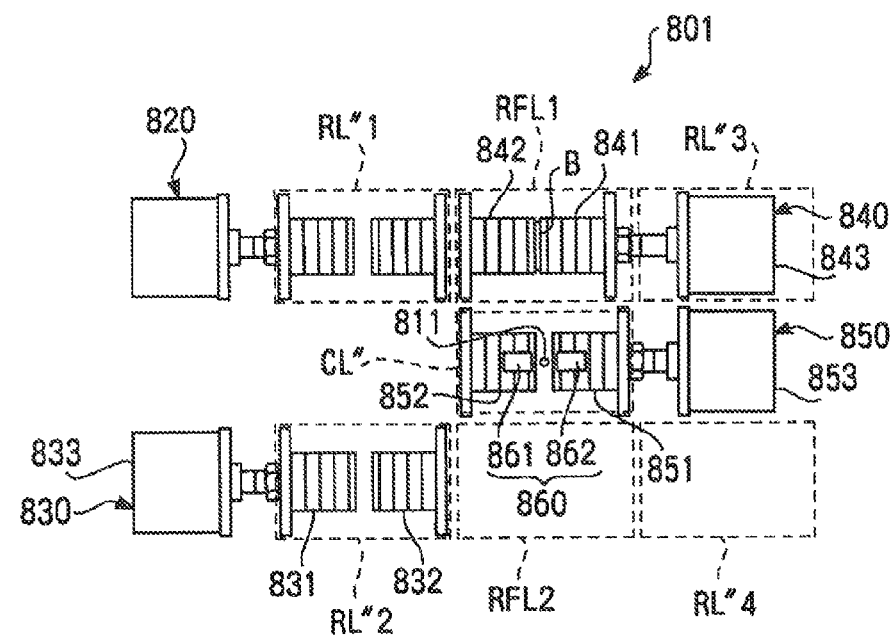
FIG. 15 is a top view of the glass blank manufacturing apparatus at a eighth step, according to the fourth embodiment of the present invention.

Then, the third press unit 840 is moved to the first retreat position RFL1 and, at the same time, the fourth press unit 850 is moved to the catch position CL", and a state becomes a condition shown in FIG. 15 (eighth step). After that, the gob GG is formed by the cutting unit 860, and the gob GG drops toward the gap between the movable mold 851 and the fixed mold 852 of the fourth press unit 850. The actuator 853 moves the movable mold 851 toward the fixed mold 852 when the gob GG goes into the gap between the movable mold 851 and the fixed mold 852, and the gob GG is caught and pressed in between the movable mold 851 and the fixed mold 852, thereby forming the glass blank B.

Figure 16:
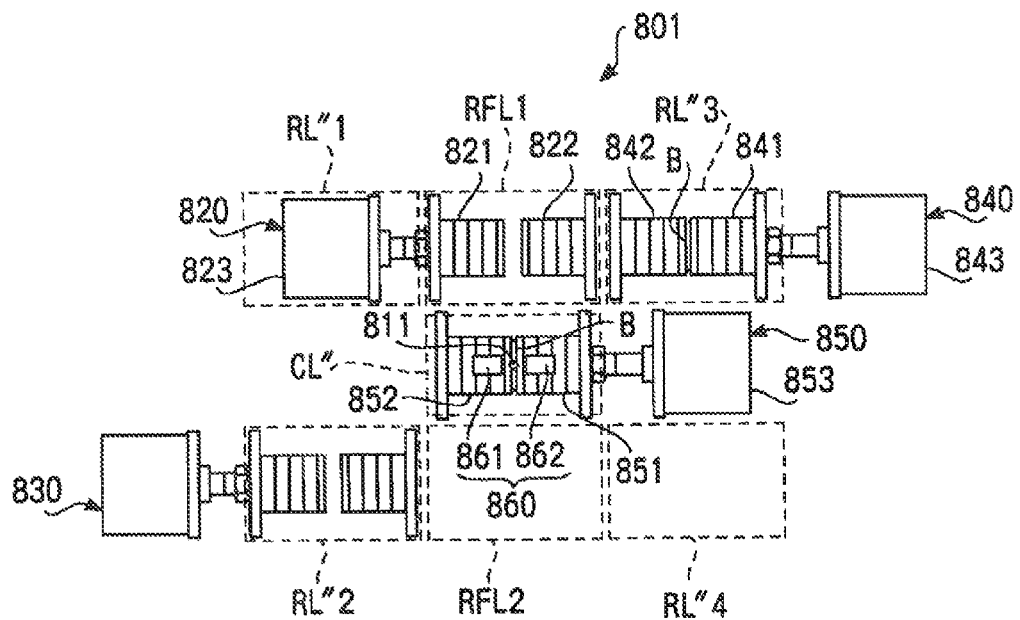
FIG. 16 is a top view of the glass blank manufacturing apparatus at a ninth step, according to the fourth embodiment of the present invention.

Then, the third press unit 840 is moved to the third release position RL"3 and, at the same time, the first press unit 820 is moved to the first retreat position RFL1, and a state becomes a condition shown in FIG. 16 (ninth step). After that, the actuator 843 of the third press unit 840 separates the movable mold 841 from the fixed mold 842, and causes the glass blank B to be dropped onto the guide 872 (FIG. 7).

Figure 17:
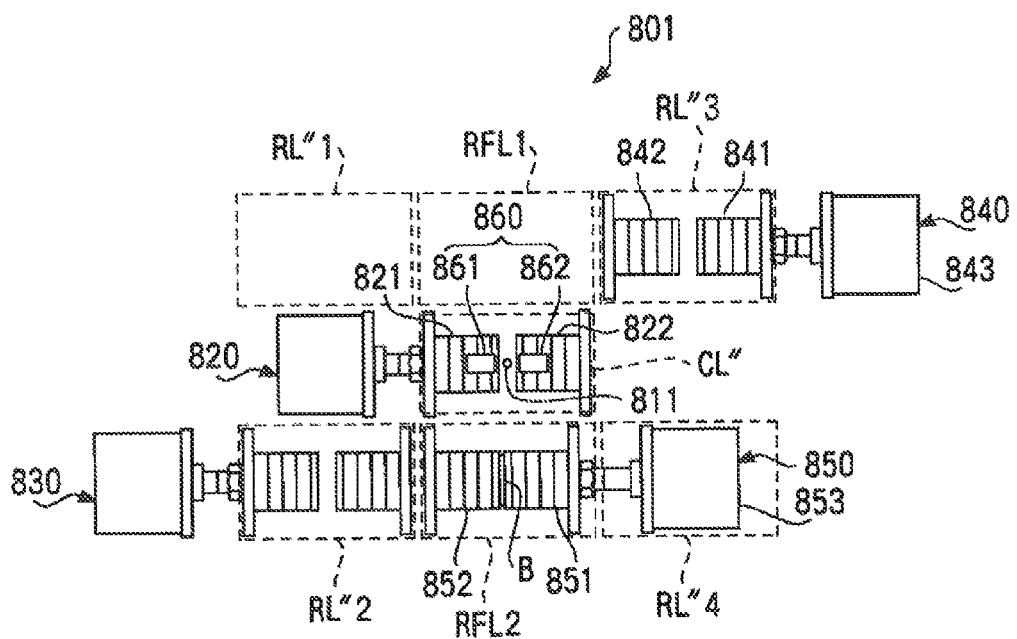
FIG. 17 is a top view of the glass blank manufacturing apparatus at a tenth step, according to the fourth embodiment of the present invention.

Then, the fourth press unit 850 is moved to the second retreat position RFL2 and, at the same time, the first press unit 820 is moved to the catch position CL", and a state becomes a condition shown in FIG. 17 (tenth step). After that, the gob GG is formed by the cutting unit 860, and the gob GG drops toward the gap between the movable mold 821 and the fixed mold 822 of the first press unit 820. The actuator 823 moves the movable mold 821 toward the fixed mold 822 when the gob GG goes into the gap between the movable mold 821 and the fixed mold 822, and the gob GG is caught and pressed in between the movable mold 821 and the fixed mold 822, thereby forming the glass blank B.

Figure 18:
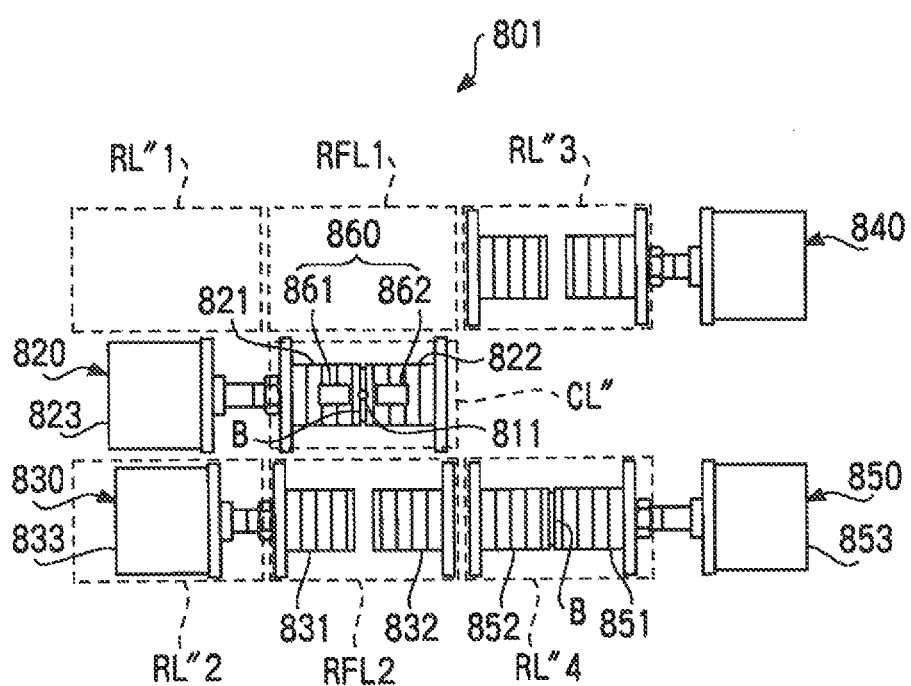
FIG. 18 is a top view of the glass blank manufacturing apparatus at a eleventh step, according to the fourth embodiment of the present invention.

Then, the fourth press unit 850 is moved, to the fourth release position RL"4 and, at the same time, the second press unit 830 is moved to the second retreat position RFL2, and a state becomes a condition shown in FIG. 18 (eleventh step). After that, the actuator 853 of the fourth press unit 850 separates the movable mold 851 from the fixed mold 852, and causes the glass blank B to be dropped onto the guide 872 (FIG. 7).

After that, the fourth step of FIG. 11 is executed again. The glass blank B is continuously manufactured by repeatedly executing eight steps of from the fourth step to the eleventh step of FIG. 18. The above is the manufacturing procedures of the glass blank B with the glass blank manufacturing apparatus 801 of the fourth embodiment of the present invention.

The press unit used in the glass blank manufacturing apparatus of the first, the second, the third, and fourth embodiments of the present invention described above is a pair of plate-like shaped molds such that the spacer is included in one of the molds. However, the present invention is not limited to the above described configuration. For example, both of the pair of molds can include the spacers. Additionally, the press unit can be shaped in a shape exemplified in FIGS. 19A and 19B.

Figure 19A:
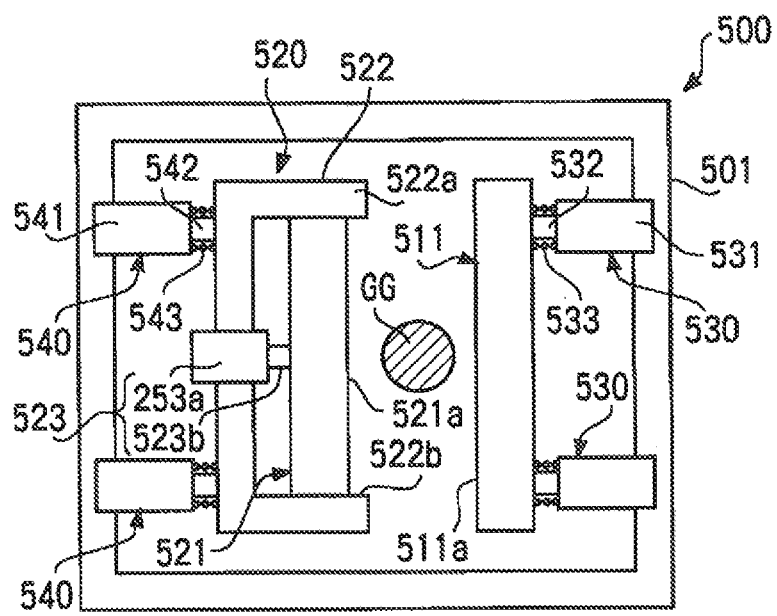
FIGS. 19A and 19B are top views of an example of a press unit which can be used in the glass blank manufacturing apparatus according to the first, the second, the third, and the fourth embodiments of the present invention.
Figure 19B:
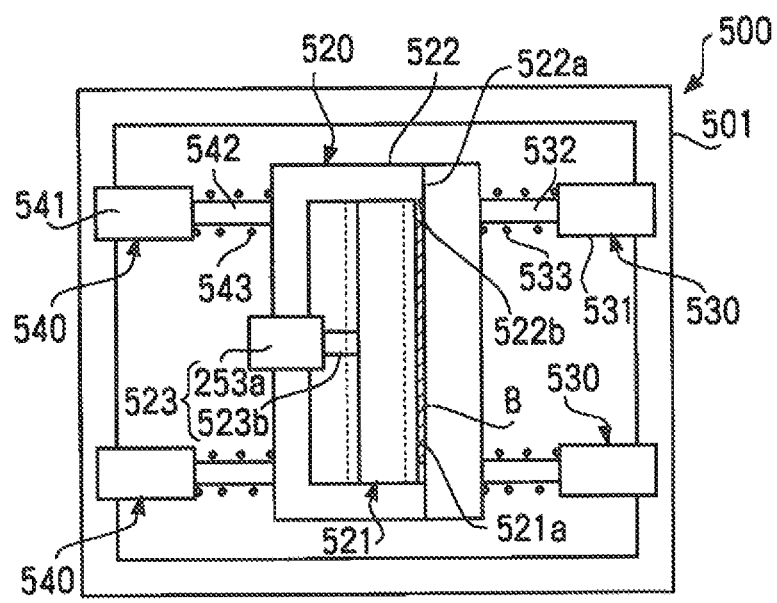

FIGS. 19A and 19B show plain views of a press unit of this example. FIG. 19A shows a state in which a first mold and a second mold are separated, and FIG. 19B shows a state in which a molten glass material is pinched between the first mold and the second mold, and a glass blank is formed. The press unit 500 shown in FIGS. 19A and 19B includes a frame 501, the first mold 511, the second mold 520, a first drive unit 530, and a second drive unit 540.

The first mold 511 is a plate-like member and is configured to catch a falling gob with its inner surrounding surface (the left side surface in the figure). In addition, a plurality of first drive units 530 are provided between the first mold 511 and the frame 501. The first drive unit 530 includes a sleeve 531 of a linear solenoid, a rod 532, and a coil spring 533. The sleeve 531 is fixed to the frame 501. On the other hand, the rod 532 is fixed to the first mold 511. In addition, the coil spring 533 is pinched in between the first mold 511 and the sleeve 531. As shown in FIG. 19A, in a state in which the first mold 511 is not catching the gob GG, the rod 532 is sucked into inside of the sleeve 531, and the coil spring 533 is compressed.

The second mold 520 includes a mold main body 521, a guide frame 522 to guide the mold main body 521, and a cylinder unit 523 to move the mold main body along the guide frame 522. The cylinder unit 523 includes a sleeve 523a and a rod 523b, and is a device which can accurately control an amount of forwarding the rod 523b with respect to the sleeve 523 (for example, a hydraulic cylinder). The sleeve 523a is fixed to the guide frame 522, and the rod 523b is fixed to the mold main body 521. The mold main body 521 can be moved back and forth along the guide frame 522 by driving the cylinder unit 523. The mold main body 521 is a plate-like member and is configured to catch the falling gob with its inner surrounding surface (the right hand side surface in the FIG. 521a.

A plurality of the second drive units 540 are provided in between the guide frame 522 of the second mold 520 and the frame 501. The second driving unit 540 includes a sleeve 541 of a linear solenoid, a rod 542, and a coil spring 543. The sleeve 541 is fixed to the frame 501. On the other hand, the rod 542 is fixed to the guide frame 522. In addition, the coil spring 543 is pinched in between the guide frame 522 and the sleeve 541. As shown in FIG. 19A, in a state in which the second mold 520 is not catching the gob GG, the rod 542 is sucked into inside of the sleeve 541, and the coil spring 543 is compressed.

If the suction of the rod 532 into the sleeve 531 and the suction of the rod 542 into the sleeve 541 are released in the state shown in FIG. 19A, the rod 532 rapidly sticks out from the sleeve 531 by a repulsive force of the coil spring 533, and the first mold 511 quickly moves toward the second mold 520, and concurrently, the rod 542 rapidly sticks out from the sleeve 541 by a repulsive force of the coil spring 543, and the second mold 520 quickly moves toward the first mold 511. At this time, if the gob GG (FIG. 19A) is in between the first mold 511 and the mold main body 521 of the second mold 520, as shown in FIG. 19B, the gob GG is pinched by the first mold 511 and the mold main body 521 of the second mold 520, and is shaped in a plate-like shape. Additionally, in a state in which the suction of the rod 532 into the sleeve 531 and the suction of the rod 542 into the sleeve 541 are released, a tip portion 522a of the guide frame 522 contacts with the first mold 511.

It is known that a glass material shrinks in a process in which the glass material is rapidly cooled from a molten state and becomes a glass. The second mold 520 of this example drives the cylinder unit 523 depending on a progress of the shrinkage of the glass material, and causes the mold main body 521 of the second mold 520 to be moved toward the first mold 511. With this, a glass blank B, whose surface on the side of the second mold 520 has an excellent flatness, is formed.

Additionally, as shown in FIG. 19A, in a process of forming the glass blank B by pressing the gob GG, the glass material contacts only with the inner surrounding surfaces 511a and 521a of the first mold 511 and the mold main body 520 of the second mold 520, and does not contact with an inner surrounding surface 522b of the guide frame 522 which functions as a spacer.

In this embodiment, a mechanism which causes the mold main body 521 to be moved a very small distance is only provided on the side of the second mold 520. However, the present invention is not limited to the above described configuration. The present invention can be configured such that a similar mechanism is provided on the side of the first mold 511.

Further, in order to improve separability of the first mold and the second mold having one of the above described configurations (including the first, the second, the third, and the fourth embodiments), a modification exemplified below can be added to the first mold and the second mold.

Figure 20:
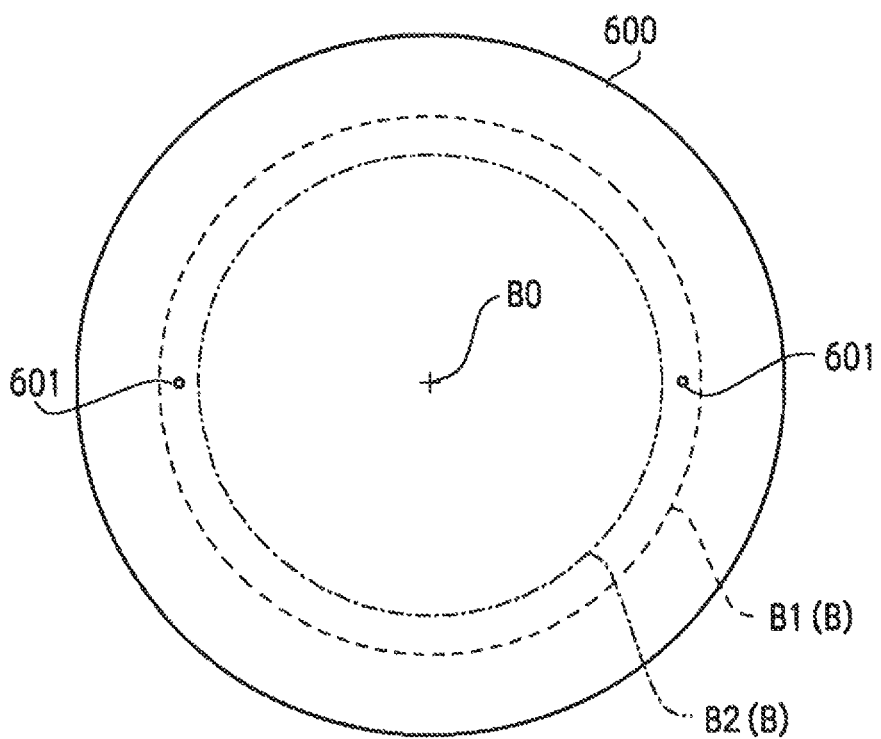
FIG. 20 is a front view of an example of the press unit which can be used in the glass blank manufacturing apparatus according to the first, the second, the third, and the fourth embodiments of the present invention.

FIG. 20 is a front view in which a mold according to this example is projected from a side of outer surrounding surface (a surface on aside which does not contact with a gob). The mold 600 of this example shown in FIG. 20 is to be adopted for both of the first mold and the second mold in the first, the second, the third, and the fourth embodiments.

Two through holes 601 for communicating the outer surrounding surface with an inner surrounding surface are provided in the mold 600 of this example. An aperture of the through hole 601 on the side of the inner surrounding surface is placed in a neighborhood of an outer circumference B1 of a glass blank B which is obtained by forming the gob. An air tank, not shown in the figure, is connected to an aperture of the through hole 601 on the side of the outer surrounding surface. When the first mold and the second mold are opened after forming the glass blank B, there are some possibilities that the glass blank adheres to one of the first mold and the second mold, and the glass blank B does not naturally separate from the mold. In this example, after the first mold and the second mold are opened, the glass blank B is forced to be separated from the mold 600 by sending compressed air into the through hole 601 from the air tank.

The glass blanks B manufactured with the glass blank manufacturing apparatus of the first, the second, and the third embodiments of the present invention are formed in a disk-like shape of a true circle by chipping away an outer circumferential portion at a post-process. As described above, in this example, since the mold has the through hole 601, a mark of the through hole 601 is formed on the glass blank B. However, since the position of the through hole 601 is placed outside of an outer circumference B2 of the glass blank B which has been formed in the post-process, the mark of the through hole 601 is not left on the glass blank B which has been formed.

For example, when a glass blank with a diameter of 65 mm, which is used as a substrate of a hard disc HD, is manufactured, the diameter of the glass blank prior to be formed at the post-process is about 75-80 mm. The through hole 601 is formed at a position whose distance from a center B0 of the glass blank B is greater than or equal to about 32.5 mm and less than or equal to 37.5 mm. Further, a diameter of the through hole 601 is about 0.2-0.3 mm.

Procedures of manufacturing a magnetic disk, which is an information recording medium, for a hard disc device, from the glass blank B formed by the above described procedures are explained.

A hard disk device reads information from or writes information on the magnetic disk by causing a magnetic head to be close to a surface of the fast rotating (for example, 7200 rpm) magnetic disk. A distance between the surface of the magnetic disk and a surface of the magnetic head is very small as about 5 nm, when performing reading or writing of information. Therefore, it is required that a flatness and surface roughness of the magnetic disk are less than or equal to 4 nm and less than or equal to 0.2 nm, respectively.

Inner surrounding surfaces of the first mold and the second mold of press devices of the first through the fourth embodiments of the present invention are planes without unevennesses. As described above, in the first through the third embodiments of the present invention, since no deformation arises during pressing and no deformation arises because of the thermal gradient within the glass blank, the flatness of the formed glass blank B is less than or equal to 4 µm, which satisfies a target flatness as a glass substrate for a magnetic disk. Therefore, in the procedures explained below, no process is performed to adjust the flatness (for example, a wrap process), and the glass blank is processed to have a desired shape and a desired flatness value.

Further, since both of the inner surfaces of the first mold and the second mold of the press devices of the first through the fourth embodiments of the present invention are planes without unevennesses, no local stress, which could be generated by engaging the glass blank with an uneven portion when the molten glass material is cooled (shrunk), is applied to the glass blank B. In addition, in the first through the fourth embodiments of the present invention, pressing is performed without contacting the molten glass material to the inner surrounding surface of the spacer of the mold. Therefore, no local stress, which could be generated, if the molten glass material contacted with the inner surrounding surface of the spacer was cooled, is applied to the glass blank B. Therefore, with the press devices of the first through the fourth embodiment of the present invention, a high-flatness glass blank B without an unevenness, which could be generated by the above described local stresses, is obtained. In addition, no crack, which could be generated by the above described local stresses, is generated in the glass blank B.

Further, "the plane" of the inner surrounding surface of the mold in the above description means a smooth surface on which no visual unevenness can be found, and with which the glass blank B which satisfies the target flatness as the glass substrate for the magnetic disk can be eventually obtained. For example, a surface including, at ordinary temperature, a shallow (difference in height is less than or equal to tens of µm) curved surface, for which a thermal deformation of the mold during pressing and a shrinkage of the glass blank during cooling are taken into consideration, is included in a range of "the plane."

Hereinafter, processes to obtain the magnetic disk from the glass blank is explained. As described above, it is necessary that the outer circumference of the glass blank B is shaped in a true circle of a desired dimension. Further, the magnetic disk is required to have a hole, to which a spindle for spinning the magnetic disk is attached. The hole is concentric to the outer circumference of the glass blank B, after shaping the outer circumference.

The shaping of the outer circumference of the glass blank B and the formation of the hole of the glass blank B are achieved by scribing. The scribing means that forming two cutting lines (linear scratches) shaped in two concentric circles on the surface of the glass blank B with a scriber made of a cemented carbide or diamond particles, in order to shape the glass blank B in a ring shape of a predetermined size having the outer circumference and the hole. The glass blank B which is scribed in a shape of two concentric circles is partially heated. Since a rate of thermal expansion of the glass blank B at an outer side of cutting line is greater than that of at an inner side, a shear stress is generated on the position of a cutting surface. Thus, an outside portion of the outer concentric circle and an inner portion of the inner concentric circle are removed from a middle portion. The middle portion becomes the glass blank B shaped in a ring shape.

Here, if the surface roughness of the glass blank B exceeds 1 µm, then it is possible that the cutting line is not uniformly formed, since the scriber does not follow an unevenness on the surface. In the first embodiment through the fourth embodiment, the surface roughness of the inner surrounding surface for press-forming the glass blank B is set to be less than or equal to 1 µm. In addition, as described above, in the first embodiment through the fourth embodiment, the surface roughness of the inner surrounding surface of the mold and the surface roughness of the glass blank B are substantially equal. Thus, the surface roughness of the formed glass blank B is regulated to be less than or equal to 1 µm. Therefore, the cutting lines are successfully formed through the scribing.

Next, a shape processing for the scribed glass blank B is performed. The shape processing includes chamfering (chamfering of the outer circumference end and the inner circumference end). Namely, chamfering is performed to the outer circumference end of the ring-shaped glass blank B and to the inner circumference end of the hole, with a diamond whetstone.

Figure 21A:
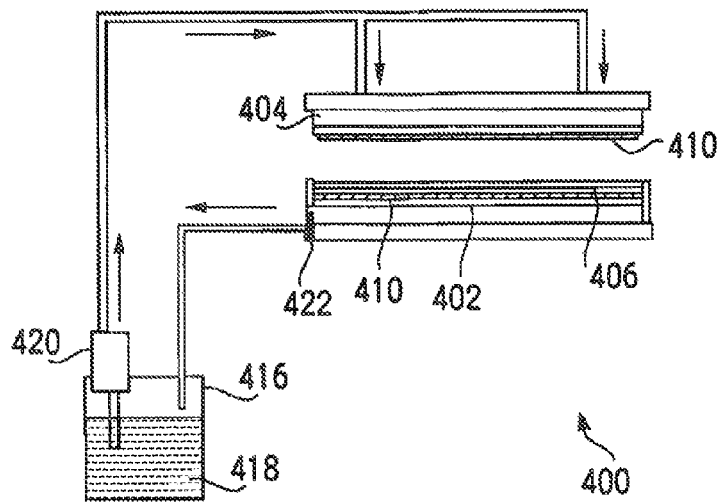
FIGS. 21A and 21B are an overall view of a grinder for performing grinding and a figure illustrating a carrier used in the grinder, respectively.
Figure 21B:
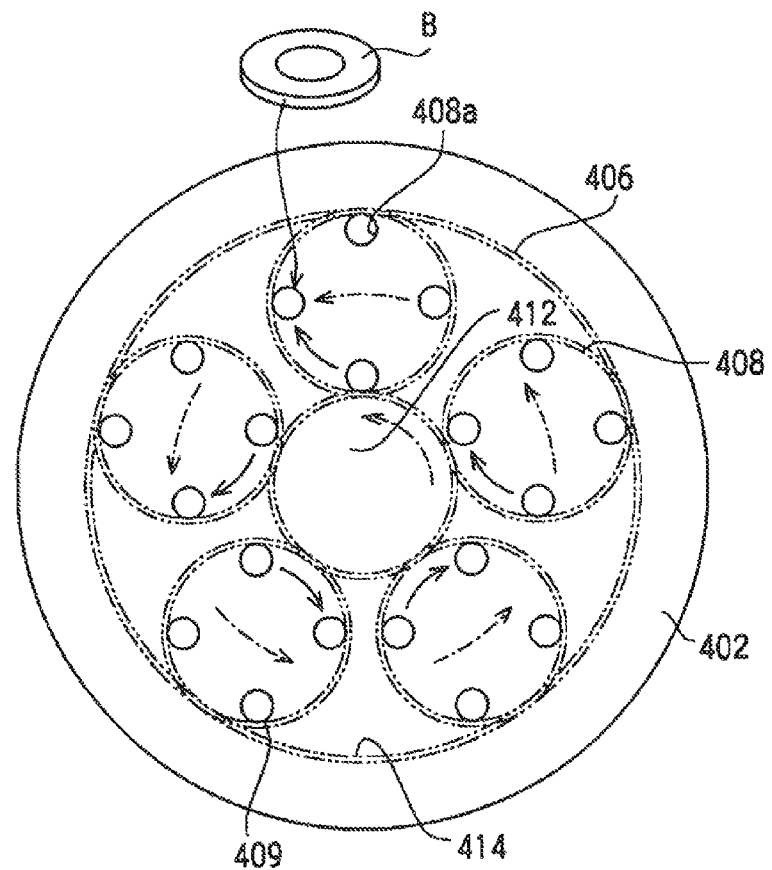

Next, grinding is performed to the ring-shaped glass blank B using fixed abrasive grains. A width removed by grinding with the fixed abrasive grains is, for example, about several µm-100 µm. A size of a particle of the fixed abrasive grains is, for example, about 10 µm. FIG. 21A is an overall view of a grinding device 400 to perform grinding. FIG. 21B is a figure for illustrating a carrier used in the grinding device 400.

As shown in FIG. 21A, the grinding device 400 includes a lower fixed plate 402, an upper fixed plate 404, an internal gear 406, a carrier 408, a diamond sheet 410, a sun gear 412, an internal gear 414, a container 416, and a coolant 418. The glass blank is grinded with the fixed abrasive grains for which the diamond sheet 410 is used.

The device 400 has a configuration such that the internal gear 406 is pinched between the lower fixed plate 402 and the upper fixed plate 404. The internal gear 406 is fixed to the lower fixed plate 402 so that it does not rotate. In addition, a plurality of carriers 408 are supported inside of the internal gear 406, so as to be able to rotate and revolve. In a configuration shown in FIG. 21B, five carriers 408 are supported. The diamond sheets 410 are adhered to a lower surface of the lower plate 402 and to an upper surface of the upper plate 404, respectively.

Further, as shown in FIG. 21B, a plurality of circular holes 408a are formed side by side on a circumference which is concentric to the carrier 408. The glass blank B is placed in the hole 408a and supported by the carrier 408. When performing grinding, a pair of main surfaces of the glass blank B contact with the diamond sheets 410, while pinched in between the lower fixed plate 402 and the upper fixed plate 404.

When the sun gear 412 is rotated in the counter clockwise direction (the solid-lined arrow direction in the figure), while contacting the pair of main surfaces of the glass blank B with the diamond sheets 410, each of the carriers 408 revolves in the counterclockwise direction (the single-point-dash-lined arrow direction in the figure), while rotating in the clockwise direction (the broken-lined arrow direction in the figure). With this, the main surfaces of the glass blank B slide with respect to the diamond sheets 410, thereby performing grinding.

As shown in FIG. 21A, the device 400 circulates the coolant by supplying the coolant 418 in the container 416 to the upper fixed plate 404 with a pump 420, and collecting the coolant 418 from the lower fixed plate 402 and returning it to the container 416. At this time, the coolant 418 is removing cut glass particles produced during grinding from grinding surfaces, while absorbing heat generated by grinding and cooling the grinding device 400 and the glass blank B. Specifically, when the device 400 circulates the coolant 418, the device 400 filters the coolant 418 with the filter 422 provided in the lower fixed plate 402, and accumulates the cut glass particles in the filter 422.

Here, when the roughness of the surface unevenness of the glass blank is less than 0.01 μm, the fixed abrasive grains slip on the surface of the glass blank, and it is difficult to perform grinding. Therefore, in order to perform grinding with the fixed abrasive grains effectively, the surface roughness of the inner surrounding surface of the mold to perform press-shaping of the glass blank is adjusted to be greater than or equal to 0.01 μm, and the roughness of the surface unevenness of the shaped glass blank B is adjusted to be greater than or equal to 0.01 μm.

As described above, in order to cut glass blank B by scribing, it is required that the surface roughness of the inner surrounding surface of the mold for forming glass blank is regulated to be less than or equal to 1 μm. Namely, in this embodiment, the surface roughness of the inner surrounding surface of the mold is set to be within the range of from 0.01 μm to 1 μm. However, if it is not required to cut the glass blank B, then the surface roughness of the inner surrounding surface of the mold can be set to be a more greater value. However, if the surface roughness of the glass blank B exceeds 10 μm, then a longer time is required for grinding and polishing. Therefore, it is preferable to set the surface roughness of the glass blank B (namely, the surface roughness of the inner surrounding surface of the mold) to be within the range of from 0.01 μm to 1 μm, even if the cutting of the glass blank B is not performed.

Further, in the grinder device 400, grinding is performed using the diamond sheets 410. However, another fixed abrasive grains including diamond particles can be used, instead of the diamond sheets 410. For example, the grinder device can be configured such that grinding is performed with a plurality of diamond particles, which are combined by a resin and shaped in a pellet-like shape, as the fixed abrasive grains.

After the grinding by the fixed abrasive grains, end surface polishing of the glass blank B is performed. At the end surface polishing, an end surface at the inner circumference side and an end surface at the outer circumference side are mirror-finished by brush polishing. At this time, a slurry, which includes fine particles of cerium oxide as loose grains, is used. By removing spoilage on the end surface of the glass blank B, such as contamination in which a dust is adhering to, a damage, or a scratch, through performing the end surface polishing, occurrence of precipitation of an ion which can be a cause of corrosion, such as sodium or potassium, can be prevented.

Next, a first polishing is performed on the main surface of the grinded glass blank B. A width removed at the first polishing is, for example, about several μm-50 μm. An objective of the first polishing is to remove a scratch and a deformation, which are remaining on the main surface as a result of grinding with the fixed abrasive grains. A similar device as the grinding device 400 used for the grinding with the fixed abrasive grains is used in the first polishing. The following are two differences between the device used for the first polishing and the grinding device 400.
a) Loose grains which are mixed in a slurry are used instead of the fixed abrasive grains.
b) A resin polisher is used instead of the diamond sheet 410.

As the loose grains used for the first polishing, for example, fine particles of cerium oxide (grain size: diameter of about 1-2 μm) which are mixed in the slurry are used.

After the first polishing, the glass blank B is chemically strengthened. As a chemical strengthening liquid, for example, a mixed liquid of potassium nitrate (60%) and sodium nitrate (40%) is used. In the chemical strengthening, the chemical strengthening liquid is heated to a temperature, for example, in a range of from 300 degrees in Celsius to 400 degrees in Celsius, and the washed glass blank B is preheated to a temperature, for example, in a range of from 200 degrees in Celsius to 300 degrees in Celsius, and after that, it is soaked in the chemical strengthening liquid for 3 hours-4 hours, for example. At this soaking, in order to chemically strengthen the both of the whole main surfaces of the glass blank B, it is preferable that the soaking is performed in a condition where the plurality of glass blanks B are stored in a holder, so that they are supported at their end surfaces.

In this manner, when the glass blank B is soaked in the chemical strengthening liquid, lithium ions and sodium ions on surface layers of the glass blank B are replaced with sodium ions and potassium ions, which have relatively large ion radii, in the chemical strengthening liquid, respectively, thereby strengthening the glass blank B. Then, the glass blank B is washed. For example, after washed with sulfuric acid, it is washed with pure water, IPA (isopropyl alcohol), etc.

Next, a second polishing is performed to the glass blank B, which has been chemically strengthened and sufficiently washed. A width removed in the second polishing is, for example, 1 μm. An objective of the second polishing is to mirror-polish the main surface. A similar device as the device used in the first polishing is used for the second polishing. The following two points are differences from the first polishing, at this time.
c) A type and a particle size of the loose grains are different.
d) Hardness of a resin polisher is different.

As the loose grains used for the second polishing, for example, fine particles of colloidal silica (grain size: diameter of about 0.1 μm) which are mixed in the slurry are used.

Next, the glass blank B is washed. A neutral detergent, pure water, and IPA are used for washing. With the second polishing, a glass substrate for a magnetic disk, such that a flatness of its main surface is less than or equal to 4 μm and surface roughness of its main surface has a surface unevenness of less than or equal to 0.2 nm, is obtained.

The magnetic disk is formed by forming layers, such as a magnetic layer, on the glass substrate for the magnetic disk, which has been formed in the above processes. Specifically, for example, an adherent layer, a soft magnetic layer, a nonmagnetic underlayer, a vertical magnetic recording layer, a protecting layer, and a lubricating layer are sequentially laminated. For the adherent layer, for example, a Cr alloy is used. The adherent layer functions as a layer adhering to the glass substrate. For the soft magnetic layer, for example, a CoTaZr alloy is used. For the nonmagnetic underlayer, for example, a granular nonmagnetic layer is used. For the vertical magnetic recording layer, for example, a granular magnetic layer is used. Additionally, for the protecting layer, a material made of hydrocarbon is used, and for the lubricating layer, for example, a fluorine-series resin is used.

To explain the above layers using a more specific example, the following layers are sequentially formed on both of the main surfaces of the glass substrate using an in-line sputtering device: an adherent layer of CrTi, a soft magnetic layer of CoTaZr/Ru/CoTaZr, a nonmagnetic granular nonmagnetic underlayer of $CoCrSiO_2$, a granular magnetic layer of $CoCrPt—SiO_2.TiO_2$, and a protecting layer of hydrocarbon. Additionally, at the top most layer of the formed layers, a lubricating layer of perfluoropolyether is formed with the dip method.

Further, the chemical strengthening process is performed between the first polishing process and the second polishing process. However, the order of these process are not limited to this order. The second polishing process should be performed after the first polishing process, but the chemical strengthening process can be arranged appropriately. For example, the chemical strengthening process can be performed after performing the second polishing process (hereinafter, process order 1). However, in the process order 1, a surface unevenness, which can be arises during the chemical strengthening process, is not removed. Thus, the order in which the chemical strengthening process is performed between the first polishing process and the second polishing process is more preferable.

Next, a composition of the glass blank B according to the first through the fourth embodiments of the present invention is explained. It is expected that the glass blank B used for an information recording medium, such as a magnetic disk, has chemical durability, a high rigidity, and a high coefficient of thermal expansion, and that the glass blank B can be chemically strengthened and has a high thermal resistance.

If the chemical durability of the glass blank B is low, surface roughness arises when the surface of the glass blank B is processed or washed, and the flatness of the glass blank B is degraded. In addition, there are some possibilities that a component, such as an alkali component, precipitates on the surface of the substrate, and the magnetic layer formed on the surface of the substrate is damaged.

In addition, since the information recording medium is rotated at a high speed, if its rigidity is low, then there are some possibilities that a deflection is generated by a centrifugal force. Therefore, it is expected that the glass blank B has a high rigidity, namely, its Young's modulus or specific elastic modulus is high.

Further, in order to allow the information recording medium to be rotary driven, a spindle is attached at the hole formed at the center of the information recording medium. In general, a stainless steel is a main material of the spindle. When the spindle and the information recording medium are rotary driven by a motor, the spindle and the information recording medium are heated by a heat generated by the motor. At this time, if a coefficient of thermal expansion of the information recording medium is too small with respect to that of the spindle, then there are some possibilities that a load is applied to the information recording medium by a thermal stress in the spindle, and a deformation is generated on the information recording medium.

Further, in order to prevent brittle fracture, it is required that the information recording medium is chemically strengthened, when its main material is a glass. Therefore, glass materials, which form the glass blank, are required to be able to be chemically strengthened, namely, it is necessary that the glass blanks include Li elements or Na elements.

Further, with a density growth of the magnetic disk, a direction of magnetization can be easily changed by an outer disturbance. To avoid changes in the direction of magnetization by the outer disturbance, as much as possible, it is preferable to enhance a Ku value by processing the magnetic layer of the magnetic disk at a high temperature. It is expected that the glass materials which form the glass blank B have high thermal resistances, so as not to generate a deformation or a fracture on the glass substrate for the magnetic disk, even if the glass substrate is processed at a high temperature.

It is preferable that the composition of the glass blank B, which has chemical durability, a high rigidity, and a high coefficient of thermal expansion, and which can be chemically strengthened and has a high thermal resistance, is as follows. Converted to standard oxidation products and expressed in mole percentages, it includes,
50 to 75% of $SiO_2$,
0 to 15% of $Al_2O_3$,
5 to 35%, in total, of $Li_2O$, $Na_2O$, and $K_2O$,
0 to 35%, in total, of $MgO$, $CaO$, $SrO$, $BaO$, and $ZnO$, and
0 to 15%, in total, of $ZrO_2$, $TiO_2$, $La_2O_3$, $Y_sO_3$, $Ta_2O_5$, $Nb_2O_5$, and $HfO_2$.

Further, in order to improve easiness of rinsing at a time when it is clear, it is preferable to add 0.1-3.5 outer percentage by mass of Sn-oxide and Ce-oxide, in total. In this case, a mass ratio of a contained amount of Sn-oxide with respect to a total contained amount of Sn-oxide and Ce-oxide (mass of Sn-oxide/(mass of Sn-oxide+mass of Ce-oxide)) is 0.01-0.99. Hereinafter, contained amounts and total contained amounts of glass elements are expressed in molar percentage, except indicated otherwise. However, contained amounts of Sn-oxide and Ce-oxide are expressed in mass percentage.

$SiO_2$ is an element for forming a glass network, and it is an essential element having effects to improve stability of glass, chemical durability, and, especially, acid resistance. The above effects are not sufficiently obtained if the contained amount of $SiO_2$ is less than 50%. If the contained amount exceeds 75%, then undissolved substances arise in the glass, or viscosity of the glass at the time when it is clear becomes too high and, consequently, the easiness of rinsing becomes insufficient. Therefore, the contained amount of $SiO_2$ is preferably in a range of 50 to 75%.

$Al_2O_3$ also contributes to form the glass network, it has effects to improve glass stability, chemical durability, and at the same time, it has an effect to increase ion-exchange rates when chemical strengthening is performed. If a contained amount of $Al_2O_3$ exceeds 15%, then melting performance of the glass is degraded, and undissolved substances tend to be arisen. Additionally, the coefficient of thermal expansion is degraded and the Young's modulus is degraded. Therefore, the contained amount of $Al_2O_3$ is preferably in a range of 0 to 15%.

$Li_2O$, $Na_2O$, and $K_2O$ have effects to improve the melting performance and moldability of the glass. Additionally, they have an effect to increase the coefficient of thermal expansion. If a contained amount of $Li_2O$, $Na_2O$, and $K_2O$ is less than 5%, then the above described effects are not sufficiently obtained. If the contained amount exceeds 35%, then chemical durability, and especially, acid resistance are degraded, and thermal stability of the glass is degraded. Additionally, a glass transition temperature is lowered and the thermal resistance is degraded. Therefore, the contained amount of $Li_2O$, $Na_2O$, and $K_2O$ is preferably in a range of 5 to 35%. Further, among $Li_2O$, $Na_2O$, and $K_2O$, $Li_2O$ has the largest effect to lower the glass transition temperature.

$MgO$, $CaO$, $SrO$, $BaO$, and $ZnO$ have effects to improve the melting performance, moldability, and the Young's modulus of the glass. Additionally, they have effects to increase the coefficient of thermal expansion and the Young's modulus. However, if a total contained amount of $MgO$, $CaO$, $SrO$, $BaO$, and $ZnO$ exceeds 35%, the chemical durability and the thermal stability of the glass are degraded. Therefore, the total contained amount of $MgO$, $CaO$, $SrO$, $BaO$, and $ZnO$ is preferably in a range of 0 to 35%.

$ZrO_2$, $TiO_2$, $La_2O_3$, $Y_2O_3$, $Ta_2O_5$, $Nb_2O_5$, and $HfO_2$ have effects to improve the chemical durability, and especially, the acid resistance, an effect to improve the thermal resistance by rising the grass transition temperature, and effects to increase the Young's modulus and fracture toughness. However, if a total contained amount of $ZrO_2$, $TiO_2$, $La_2O_3$, $Y_2O_3$, $Ta_2O_5$, $Nb_2O_5$, and $HfO_2$ exceeds 15%, then the melting performance of the glass is degraded, and undissolved glass materials remain in the glass. Therefore, the total contained amount of $ZrO_2$, $TiO_2$, $La_2O_3$, $Y_2O_3$, $Ta_2O_5$, $Nb_2O_5$, and $HfO_2$ is preferably in a range of 0 to 15%.

Five embodiments of the glass materials satisfying the above described conditions are explained.

A first embodiment is emphasizing efficiency of the chemical strengthening. The following is a composition of a glass material of this embodiment:
- a contained amount of $SiO_2$: 60 to 75%,
- a contained amount of $Al_2O_3$: 3 to 12%,
- a total contained amount of $Li_2O$, $Na_2O$, and $K_2O$: 23 to 35%,
- a total contained amount of MgO, CaO, SrO, BaO and ZnO: 0 to 5%,
- a total contained amount of $ZrO_2$, $TiO_2$, $La_2O_3$, $Y_2O_3$, $Yb_2O_3$, $Ta_2O_5$, $Nb_2O_5$, and $HfO_2$: 0 to 7%.

A second embodiment is emphasizing the chemical durability. The following is a composition of a glass material of this embodiment:
- a contained amount of $SiO_2$: 60 to 75%,
- a contained amount of $Al_2O_3$: 1 to 15%,
- a total contained amount of $Li_2O$, $Na_2O$, and $K_2O$: 15 to 25%,
- a total contained amount of MgO, CaO, SrO, BaO and ZnO: 1 to 6%,
- a total contained amount of $ZrO_2$, $TiO_2$, $La_2O_3$, $Y_2O_3$, $Yb_2O_3$, $Ta_2O_5$, $Nb_2O_5$, and $HfO_2$: 1 to 9%.

A third embodiment is emphasizing high rigidity. The following is a composition of a glass material of this embodiment:
- a contained amount of $SiO_2$: 50 to 70%,
- a contained amount of $Al_2O_3$: 1 to 8%,
- a total contained amount of $Li_2O$, $Na_2O$, and $K_2O$: 12 to 22%,
- a total contained amount of MgO, CaO, SrO, BaO and ZnO: 10 to 20%,
- a total contained amount of $ZrO_2$, $TiO_2$, $La_2O_3$, $Y_2O_3$, $Yb_2O_3$, $Ta_2O_5$, $Nb_2O_5$, and $HfO_2$: 3 to 10%.

A fourth embodiment is emphasizing a high thermal resistance. The following is a composition of a glass material of this embodiment:
- a contained amount of $SiO_2$: 50 to 70%,
- a contained amount of $Al_2O_3$: 1 to 10%,
- a total contained amount of $Li_2O$, $Na_2O$, and $K_2O$: 5 to 17% (here, $Li_2O$: 0 to 1%),
- a total contained amount of MgO, CaO, SrO, BaO and ZnO: 10 to 25%,
- a total contained amount of $ZrO_2$, $TiO_2$, $La_2O_3$, $Y_2O_3$, $Yb_2O_3$, $Ta_2O_5$, $Nb_2O_5$, and $HfO_2$: 1 to 12%.

A fifth embodiment is emphasizing a high thermal resistance, high rigidity, and a coefficient of thermal expansion. The following is a composition of a glass material of this embodiment:
- a contained amount of $SiO_2$: 50 to 75%,
- a contained amount of $Al_2O_3$: 0 to 5%,
- a total contained amount of $Li_2O$, $Na_2O$, and $K_2O$: 3 to 15% (here, $Li_2O$: 0 to 1%),
- a total contained amount of MgO, CaO, SrO, BaO and ZnO: 14 to 35%,
- a total contained amount of $ZrO_2$, $TiO_2$, $La_2O_3$, $Y_2O_3$, $Yb_2O_3$, $Ta_2O_5$, $Nb_2O_5$, and $HfO_2$: 2 to 9%.

The first and the second mold used in the press devices of the first through the fourth embodiments are molds which are made of a heat-resisting alloy, and their upper temperature limit is about 1250 degrees in Celsius. For manufacturing a molded glass product, it is necessary to quench a molten glass. Thus, when shaping of the glass blank B is performed, a temperature of the molten glass material prior to performing pressing is set to be close to the upper temperature limit, namely, about 1250 degrees in Celsius.

The glass materials used in the press devices of the first through the fourth embodiments are such that if their viscosities at a time of shaping (namely, about 1250 degrees in Celsius) exceed 2000 dPa·s, it becomes difficult to shape the glass materials into a desired size (diameter and thickness) (it is necessary to make a press pressure extremely large, or to elongate time for pressing). Therefore, the viscosities of the glass materials at about 1250 degrees in Celsius are preferably less than or equal to 2000 dPa·s. It is more preferable that the viscosities of the glass materials at about 1250 degrees in Celsius are less than or equal to 1050 dPa·s.

On the other hand, if the viscosity of the glass material at the time of shaping becomes less than 20 dPa·s, then shaping into the glass blank B becomes difficult, because the viscosity is too low. Therefore, it is preferable that the viscosity of the glass material at about 1250 degrees in Celsius is greater than or equal, to 20 dPa·s. It is more preferable that the viscosity of the glass material at about 1250 degrees in Celsius is greater than or equal to 50 dPa·s.

Table 1 below shows an example of the composition, viscosity at 1250 degrees in Celsius, a liquidus temperature, and a glass transition temperature of each of the glass materials of the above described first through fifth embodiments. As shown in Table 1, the viscosities of the glass materials of the first through the fifth embodiments are within a range of 50 to 1050 dPa·s.

TABLE 1

|  |  | First Embodiment | Second Embodiment | Third Embodiment | Fourth Embodiment | Fifth Embodiment |
|---|---|---|---|---|---|---|
| Glass Composition | $SiO_2$ | 66 | 68 | 61 | 64 | 66 |
|  | $Al_2O_3$ | 9 | 9 | 2 | 5 | 0.5 |
|  | $Li_2O$ | 12 | 8 | 14 | 4 | 0 |
|  | $Na_2O$ | 10 | 11 | 5 | 6 | 3 |
|  | $K_2O$ | 0 | 0.2 | 0 | 1 | 6 |
|  | $Li_2O + Na_2O + K_2O$ | 22 | 19.2 | 19 | 11 | 9 |
|  | MgO | 0 | 1 | 0 | 0 | 6.5 |
|  | CaO | 0 | 1.8 | 13 | 13 | 13 |
|  | SrO | 0 | 0 | 0 | 0 | 0 |
|  | BaO | 0 | 0 | 0 | 3 | 0 |
|  | ZnO | 0 | 0 | 0 | 0 | 0 |
|  | MgO + CaO + SrO + BaO + ZnO | 0 | 2.8 | 13 | 16 | 19.5 |
|  | $ZrO_2$ | 3 | 1 | 5 | 4 | 5 |

TABLE 1-continued

| | | First Embodiment | Second Embodiment | Third Embodiment | Fourth Embodiment | Fifth Embodiment |
|---|---|---|---|---|---|---|
| | $TiO_2$ | 0 | 0 | 0 | 0 | 0 |
| | $La_2O_3$ | 0 | 0 | 0 | 0 | 0 |
| | $Y_2O_3$ | 0 | 0 | 0 | 0 | 0 |
| | $Yb_2O_3$ | 0 | 0 | 0 | 0 | 0 |
| | $Ta_2O_5$ | 0 | 0 | 0 | 0 | 0 |
| | $Nb_2O_5$ | 0 | 0 | 0 | 0 | 0 |
| | $Hf_2O_5$ | 0 | 0 | 0 | 0 | 0 |
| | $ZrO_2 + TiO_2 + La_2O_3 + Y_2O_3 + Ta_2O_5 + Nb_2O_5 + HfO_2$ | 3 | 1 | 5 | 4 | 5 |
| | Total (mole percentage) | 100 | 100 | 100 | 100 | 100 |
| | $SnO_2$ (outer mass percentage) | 0.6 | 0.6 | 0.6 | 0.6 | 0.6 |
| | $CeO_2$ (outer mass percentage) | 0.4 | 0.4 | 0.4 | 0.4 | 0.4 |
| | $SnO_2 + CeO_2$ (outer mass percentage) | 1.0 | 1.0 | 1.0 | 1.0 | 1.0 |
| | $SnO_2/(SnO_2 + CeO_2)$ (mass ratio) | 0.6 | 0.6 | 0.6 | 0.6 | 0.6 |
| Characteristic | Viscosity (dPa · s) of the glass at 1250 degrees in Celsius | 650 | 1000 | 50 | 850 | 1050 |
| | Liquidus temperature (degrees in Celsius) | 840 | 920 | 1000 | 1080 | 1180 |
| | Glass transition temperature (degrees in Celsius) | 500 | 505 | 535 | 665 | 700 |

EXAMPLES

Hereinafter, the glass blank manufactured with the glass blank manufacturing apparatus of the embodiment of the present invention explained above (a first example) and the glass blank manufactured with a glass blank manufacturing apparatus with a conventional configuration (a first comparative example) are explained.

First Example

The glass blank B, which is used as the glass substrate for the magnetic disk and which has a diameter of 77 mm and a thickness of 0.9 mm, is produced, using the glass blank manufacturing apparatus 101 (FIG. 1, FIGS. 2A-2C) of the first embodiment of the present invention, in the following procedures.

First, the glass materials are prepared so as to obtain the composition of the first embodiment in Table 1, and are poured into a glass melting furnace. Then, the glass materials are melted, clarified, and homogenized. The obtained molten glass is discharged from the molten glass outlet 111. A temperature of the molten glass material LG discharged from the molten glass outlet 111 is 1300 degrees in Celsius, and at this time, the viscosity of the molten glass material is 700 poise. Additionally, temperatures of the first and second molds of the press units 120, 130, 140, and 150 are controlled to be around 420 degrees in Celsius.

The molten glass material LG discharged from the molten glass outlet 111 is cut by the cutting unit 160, and the gob GG with a diameter of about 20 mm is formed. The gob GG is pressed by the press unit with a load of 3000 kgf, until its temperature becomes lower than the glass transition temperature of the molten glass material (about 3 seconds), thereby forming the glass blank B. Similarly, the glass blanks B are produced using the glasses having respective compositions of the second through fifth embodiments in Table I, with similar methods as the method described above.

First Comparative Example

Figure 22A:
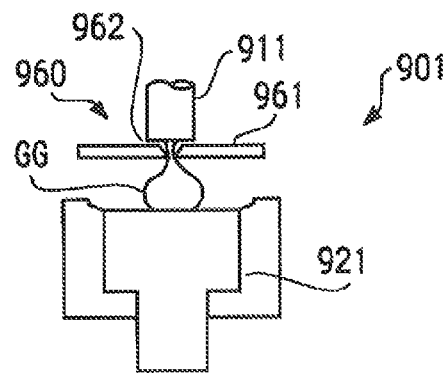
FIGS. 22A, 22B, 22C, and 22D are side views of a glass blank device of a conventional configuration.

The glass blank B with a diameter of 77 mm and a thickness of 0.9 mm is formed using a glass blank manufacturing apparatus 901 having a conventional configuration, shown in FIGS. 22A-22D. Specifically, as shown in FIG. 22A, a molten glass material discharged from the molten glass outlet 911 is cut with a cutting unit 960, which includes a pair of cutting blades 961 and 962, and a gob GG is formed. The gob GG is put on a lower mold 921 placed below the molten glass outlet 911. Additionally, a temperature and viscosity of the molten glass material are the same as that of the first example.

Figure 22B:
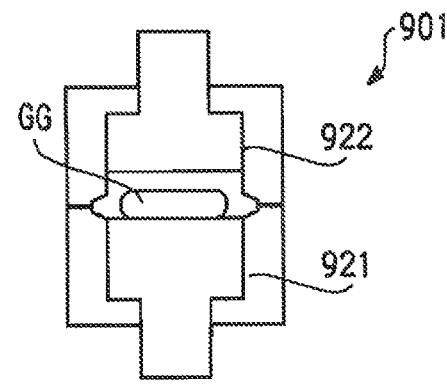
Figure 22C:
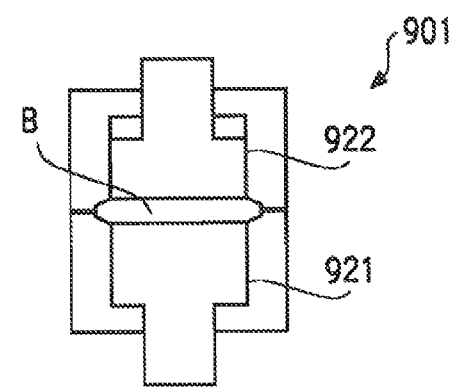
Figure 22D:
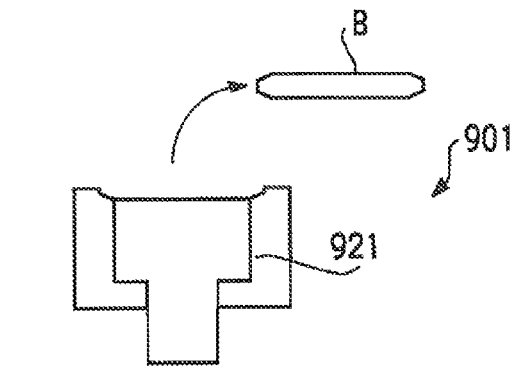

Next, the lower mold 921 is moved below an upper mold 922 (FIG. 22B). At this time, a temperature of the upper mold is controlled to be about 420 degrees in Celsius, and a temperature of the lower mold is controlled to be about 450 degrees in Celsius. Then, the upper mold 922 is descended and the gob GG is pressed in between the upper mold 922 and the lower mold 921 with a load of 3000 kgf for about 0.5 second (FIG. 22C). As the gob GG is pressed in between the upper mold 922 and the lower mold 921, the gob GG is rapidly cooled and the disk-like shaped glass blank B is formed. Then, the upper mold 922 is raised, and the lower mold 921 is moved so as to be separated from below the upper mold 922. Next, after naturally cooling the glass blank B for a defined period of time, the glass blank is taken out from on the lower mold 921. Additionally, in the comparative example 1, five types of glass blanks B are produced from the glass materials of five types of components of the first through the fifth embodiments in Table I", similarly as the first example.

(Comparison Between First Example and First Comparative Example)

The shapes of the glass blanks B manufactured in the above described procedures are measured using a three-dimensional measuring instrument and a micro meter. Results of measurements are shown in Table 2.

TABLE 2

|  | First Example | First Comparative Example |
|---|---|---|
| Roundness tolerance of the glass blanks | 1000 µm | 100 µm |
| Flatness of the glass blanks | 3 µm | 20 µm |
| Board thickness deviation of the glass blanks | 3 µm | 15 µm |

As shown in Table 2, the flatness and the board thickness of each of the glass blanks B manufactured with the glass blank manufacturing devices of the first example are significantly smaller than that of the first comparative example. It can be understood that fine glass blanks B as glass substrates for magnetic disks are obtained without performing surface grinding, such as a wrap process. On the other hand, the roundness tolerance of the glass blanks B of the first example is greater than the roundness tolerance of the glass blanks B of the first comparative example. However, the glass blank B manufactured with the glass blank manufacturing device is cut to be a disk of a true circle with a diameter of 65 mm. Thus, the roundness tolerance of about 1000 µm does not give any influence on a performance as the glass substrate for the magnetic disk. When the glass substrates for the magnetic disk are manufactured by applying grinding processes and polishing processes using the diamond sheets to the glass blanks manufactured in the first example, without performing a warp process, the flatness is less than or equal to 4 µm. On the other hand, when the glass substrates for the magnetic disk are manufactured by applying wrap processes, grinding processes and polishing processes using the diamond sheets to the glass blanks manufactured in the first comparative example, the flatness can be made less than or equal to 4 µm. However, when the glass substrates for the magnetic disk are manufactured by omitting the wrap processes, and applying the grinding processes and polishing processes using the diamond sheets to the glass blanks manufactured in the first comparative example, the flatness cannot be made less than or equal to 4 µm.

Second Comparative Example

Further, in the glass blank manufacturing apparatuses of the embodiments of the present invention, only press surfaces, which are surfaces contact with the gob at a time of pressing, and the spacer are formed on the inner surrounding surfaces of the first mold and the second mold. On the other hand, a configuration can be considered in which annular protruding portions are formed on the inner surfaces of the first and the second mold, so that shaping of the outer circumference and forming of the hole can be easily performed, for example, such as a configuration shown in Japanese Patent No. 4380379. Namely, two pairs of concentric annular protruding portions are formed on each of the inner surrounding surfaces of the first and the second molds. On the blank formed with such molds, annular grooves are formed by the protruding portions. Thus, the glass blank can be easily cut at positions of the grooves.

However, the glass blank manufacturing apparatuses of the embodiments have an advantage in which the thickness and the flatness of the glass blank can be accurately controlled in comparison with the manufacturing apparatus with the above described configuration.

Figure 23A:
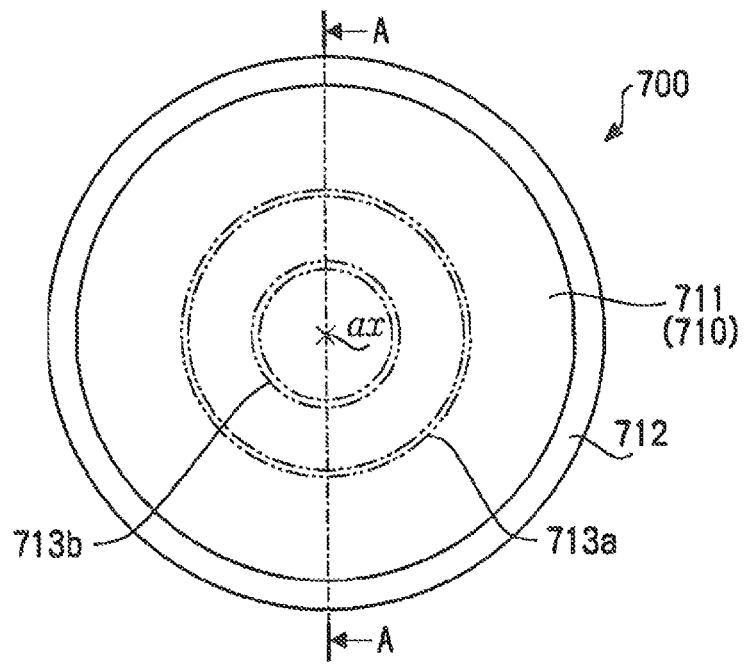
FIG. 23A is a front view on which a mold of a glass blank manufacturing device in a second comparative example is projected from a side of an inner surrounding surface.
Figure 23B:
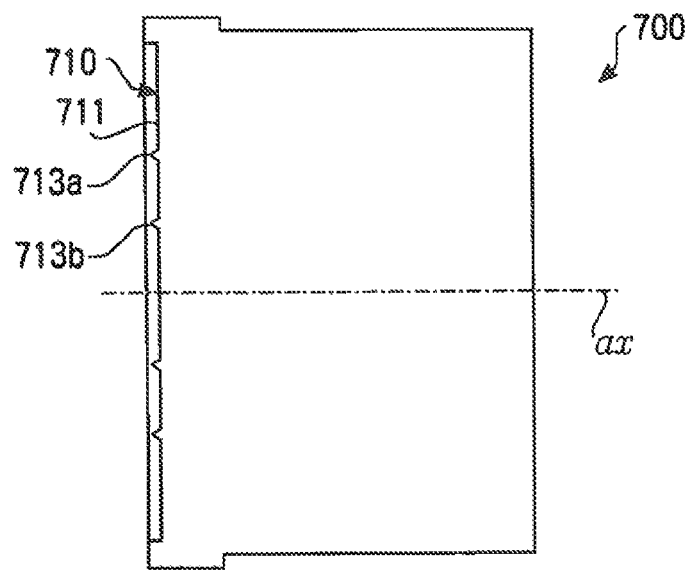
FIG. 23B is an A-A cross-sectional view of FIG. 23A.

The glass blank manufacturing apparatus with the above described configuration and a blank manufactured with this glass blank manufacturing apparatus are explained as a second comparative example. FIG. 23A is a front view in which a mold of the glass blank manufacturing apparatus of the second comparative example is projected from an inner surrounding surface side, and FIG. 23B is an A-A cross-sectional view of FIG. 23A. In the second comparative example, the first mold and the second mold have the same shape. Further, the glass blank manufacturing apparatus of the second comparative example is the same as the glass blank manufacturing apparatuses of the embodiments, except for the shapes of the molds. Additionally, the glass blank B of the second comparative example is manufactured from the glass materials of the first embodiment.

As shown in FIGS. 23A and 23B, a mold 700 of the second comparative example is such that a press surface 711, which is a plane perpendicular to a central axis ax of the mold 700, is formed on an inner surrounding surface 710 of the mold 700. Further, on the inner surrounding surface 710, a spacer 712, which is an annular protruding portion, is formed on a portion neighboring to an outer side of the press surface 711. In addition, the press surface 711 is divided by concentric annular protruding portions 713a and 713b, which are centered by the central axis ax.

A diameter of the press surface 711 of the mold 700 of the second comparative example is 145 mm, and diameters of the protruding portion 713a and 713b are 65 mm and 20 mm, respectively. Additionally, a height of the spacer 712 (namely, a distance between the press surface 711 and the spacer 712) is 0.5 mm, and heights of both of the protruding portion 713a and 713b are 0.3 mm. The above described dimension of the mold 700 is at an ordinary temperature, and the height of the spacer 712 is reduced to 0.43 mm by thermal expansion. Namely, when two molds 700 are confronted to each other in a state in which the molds 700 are heated, a distance between the two press surfaces 711 are 0.86 mm.

A result of measurements of thickness of the glass blanks B, which are formed with the mold 700 of the second comparative example explained above, is shown in Table 3 below. Further, press time periods are set to be 0.2 second, 0.3 second, 0.5 second, 0.8 second, and 1.0 second, and a number of samples are three, respectively. Additionally, a thickness of each of the samples is an average value of thicknesses at four points, which are defined at every 90 degrees, with respect to each other, on a circle of radius 60 mm and on a circle of radius 25 mm, centered by the central axis ax.

TABLE 3

| Press Time Period [s] | Sample # | □60 | | □25 | | □60 and □25 | |
|---|---|---|---|---|---|---|---|
| | | Average Value [mm] | Standard Deviation [mm] | Average Value [mm] | Standard Deviation [mm] | Average Vale [mm] | Standard Deviation [mm] |
| 0.2 | 1 | 0.909 | 0.00440 | 0.893 | 0.00171 | 0.901 | 0.00897 |
| | 2 | 0.909 | 0.00480 | 0.893 | 0.00465 | 0.901 | 0.00961 |
| | 3 | 0.909 | 0.00523 | 0.895 | 0.00171 | 0.902 | 0.00843 |
| 0.3 | 1 | 0.910 | 0.00183 | 0.891 | 0.00222 | 0.901 | 0.01020 |
| | 2 | 0.906 | 0.00574 | 0.892 | 0.00263 | 0.899 | 0.00878 |
| | 3 | 0.907 | 0.00263 | 0.891 | 0.00263 | 0.899 | 0.00889 |
| 0.5 | 1 | 0.895 | 0.00082 | 0.876 | 0.00252 | 0.885 | 0.01057 |
| | 2 | 0.916 | 0.00340 | 0.902 | 0.00258 | 0.909 | 0.00811 |
| | 3 | 0.898 | 0.00330 | 0.875 | 0.00096 | 0.887 | 0.01250 |
| 0.8 | 1 | 0.924 | 0.00523 | 0.918 | 0.00171 | 0.921 | 0.00491 |
| | 2 | 0.907 | 0.00497 | 0.892 | 0.00538 | 0.899 | 0.00946 |
| | 3 | 0.906 | 0.00310 | 0.894 | 0.00265 | 0.900 | 0.00732 |
| 1.0 | 1 | 0.903 | 0.00476 | 0.888 | 0.00191 | 0.895 | 0.00894 |
| | 2 | 0.903 | 0.00299 | 0.887 | 0.00096 | 0.895 | 0.00880 |
| | 3 | 0.904 | 0.00096 | 0.885 | 0.00082 | 0.895 | 0.01032 |

(Comparison Between First Example and Second Comparative Example)

As shown in Table 3, the thicknesses of the glass blanks B formed with the device with the configuration of the second comparative example exceeds 0.86 mm. This means that the glass blanks B become solidified prior to contacting the spacers 712 of the molds 700 to each other. In addition, for the glass blanks B formed with the device with the configuration of the second comparative example, variations in thickness of about 0.05 mm are identified, and a tendency that an outer diameter side is thinner than an inner diameter side is found. Therefore, in order to produce a magnetic disk from the glass blank B formed with the device with the configuration of the second comparative example, it is necessary to perform a surface grinding, such as a wrap process. In addition, for the glass blanks B formed with the device with the configuration of the second comparative example, when the press period becomes greater than or equal to 0.5 second, cracks arise in a part of samples.

On the other hand, as shown in Table 1, for the glass blanks B of the first example, the flatness is 3 μm and variations in thickness are regulated within 6 (0.006 mm). Additionally, their thicknesses are equal to the distance between the press surfaces when they are pressed. Further, in the configuration of the first example, no crack is detected in the glass blank B, even if the press period is set to 10 seconds. Since the flatness of the glass blank B becomes the higher as the press period becomes the longer, in the glass blank manufacturing device of the first example, the glass blank with the high flatness can be manufactured, without generating cracks.

(Magnetic Disk Produced with Glass Blank of the First Example)

A glass substrate for the magnetic disk is produced through applying the grinding process and the polishing process using the diamond sheets to the glass blank B of the above described first example, as a raw material, without applying a wrap process. The magnetic disk is produced through forming layers, such as a magnetic layer, on the glass substrate for the magnetic disk. Similarly, a glass substrate for the magnetic disk is produced through applying a wrap process, the grinding process and the polishing process using the diamond sheets to glass blank B of the first comparative example, as a raw material. The magnetic disk is produced through forming layers, such as a magnetic layer, on the glass substrate for the magnetic disk. Then, these magnetic disks are built into a hard disk drive, and tests of writing data and reading data are conducted. As a result, no difference on the performances between the magnetic disk using the glass blank B of the first example as the raw material and the magnetic disk using the glass blank B of the first comparative example as the raw material is identified. Namely, the magnetic disk with a sufficient performance is produced from the glass blank B of the first example, without applying a wrap process.

What is claimed is:

1. A method of manufacturing a glass blank for a substrate for an information recording medium, the method including steps of:
    cutting out a gob of a glass material from a molten glass material by cutting the molten glass material discharged from a glass material outlet at a predetermined timing, so as to separate the gob of the glass material from the molten glass material;
    causing the separated gob of the glass material to fall downwardly so that the separated gob falls into a space between a pair of molds of a press unit;
    catching the separated gob of the glass material between the pair of molds, and pinching and pressing the separated gob of the glass material by the pair of molds, the molds' surfaces facing to each other being press surfaces which are planes without an unevenness, so as to contact the falling gob of the glass material only to the press surfaces; and
    forming, from the gob of the glass material, a circular flat plate-shaped glass blank having a target flatness as a glass substrate for a magnetic disk such that a ratio between a diameter and a thickness of the glass blank is within range of from 50:1 to 150:1.

2. The method of manufacturing the glass blank for the substrate for the information recording medium according to claim 1;
    wherein the pressing of the glass material by the press unit is performed through moving the press unit from a first condition, in which a distance between the press surfaces of the pair of molds is greater than a size in a horizontal direction of the gob of the glass material, to a second condition, in which the distance between the press surfaces of the pair of molds substantially coincides with a size in a direction of the thickness of the glass blank, within 0.1 second after the gob of the glass material contacts one of the pair of molds.

3. The method of manufacturing the glass blank for the substrate for the information recording medium according to claim 1;
   wherein temperatures of the pair of molds are regulated to be less than a glass transition temperature of the glass material.

4. The method of manufacturing the glass blank for the substrate for the information recording medium according to claim 1;
   wherein the molten glass material discharged from the glass material outlet is cut and the falling gob of the glass material is formed through moving cutting blades placed below the molten glass outlet, so that the cutting blades intersect with the glass material.

5. The method of manufacturing the glass blank for the substrate for the information recording medium according to claim 1;
   wherein surface roughness of the press surfaces is within a range of from 0.01 to 10 μm.

6. The method of manufacturing the glass blank for the substrate for the information recording medium according to claim 1;
   wherein a viscosity of the falling gob of the glass material is within a range of from 50 to 1050 dPa·s.

7. A method of manufacturing a substrate for an information recording medium, comprising:
   manufacturing a glass blank according to the method of claim 1; and
   grinding the glass blank to be shaped in a disk of a true circle with a predetermined diameter; and
   polishing the ground glass blank.

8. A method of manufacturing an information recording medium, comprising:
   manufacturing a substrate for the information recording medium according to the method of claim 7; and
   forming information recording layers on the substrate for the information recording medium.

* * * * *